US010490906B2

United States Patent
Xu et al.

(10) Patent No.: US 10,490,906 B2
(45) Date of Patent: Nov. 26, 2019

(54) SLOT WAVEGUIDE WITH STRUCTURAL MODULATION

(71) Applicants: Xiaochuan Xu, Austin, TX (US); Ray T. Chen, Austin, TX (US)

(72) Inventors: Xiaochuan Xu, Austin, TX (US); Ray T. Chen, Austin, TX (US)

(73) Assignee: Omega Optics, Inc., Austin, TX (US)

( * ) Notice: Subject to any disclaimer, the term of this patent is extended or adjusted under 35 U.S.C. 154(b) by 298 days.

(21) Appl. No.: 15/683,527

(22) Filed: Aug. 22, 2017

(65) Prior Publication Data

US 2019/0067830 A1 Feb. 28, 2019

(51) Int. Cl.
| | | |
|---|---|---|
| H01Q 21/00 | (2006.01) | |
| H01P 3/123 | (2006.01) | |
| H01Q 21/22 | (2006.01) | |
| G01T 1/24 | (2006.01) | |
| H04B 10/50 | (2013.01) | |
| G02F 1/00 | (2006.01) | |
| G02B 6/12 | (2006.01) | |

(52) U.S. Cl.
CPC ........... *H01Q 21/0062* (2013.01); *G01T 1/24* (2013.01); *G02F 1/00* (2013.01); *H01P 3/123* (2013.01); *H01Q 21/22* (2013.01); *H04B 10/50* (2013.01); *G02B 6/12007* (2013.01); *G02B 2006/12138* (2013.01)

(58) Field of Classification Search
CPC ...... H01Q 21/0062; H01Q 21/22; G01T 1/24; H04B 10/50; G02B 6/12007; H01P 3/123
See application file for complete search history.

(56) References Cited

U.S. PATENT DOCUMENTS

| | | | |
|---|---|---|---|
| 2018/0269557 A1* | 9/2018 | Fangfang | H01P 3/123 |
| 2019/0067830 A1* | 2/2019 | Xu | H01Q 21/0062 |
| 2019/0235053 A1* | 8/2019 | Spector | G01S 7/4811 |

* cited by examiner

*Primary Examiner* — Andrew Jordan
(74) *Attorney, Agent, or Firm* — Taboada Law Firm, PLLC; John M. Taboada

(57) ABSTRACT

Apparatuses for communication or sensing are disclosed, the apparatuses comprising a substrate; a bottom cladding disposed on the substrate; a device layer disposed on the bottom cladding, wherein the device layer comprises: two substantially parallel rails extending from an input side to an output side of the device layer and configured to form a slot between the two substantially parallel rails, wherein each of the two substantially parallel rails comprises an inner edge adjacent to the slot and an outer edge opposite the slot; and one or more teeth coupled to each of the two substantially parallel rails; and a top cladding disposed onto the device layer and bottom cladding; wherein the bottom cladding, the device layer, and the top cladding are configured to support at least one optical guided mode. Other embodiments are described and claimed.

17 Claims, 27 Drawing Sheets

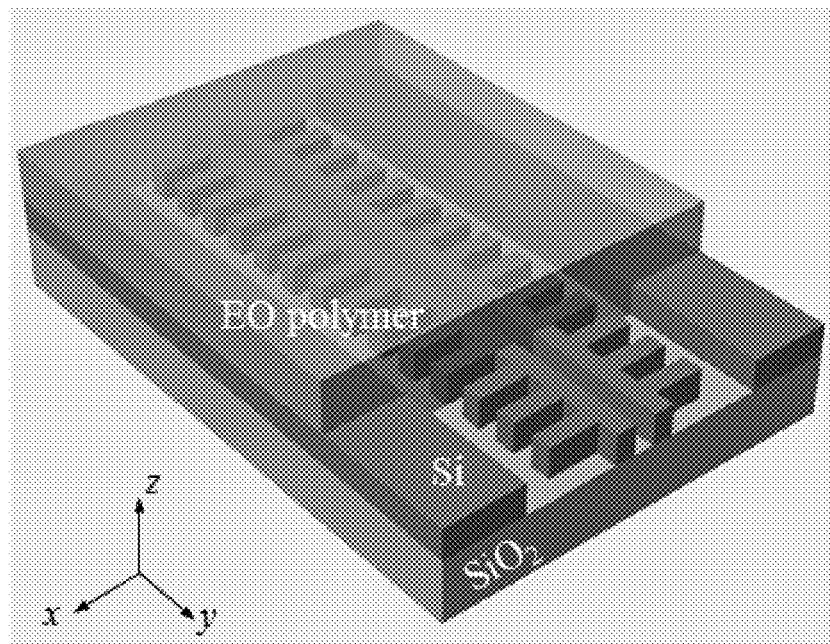
*Fig. 8A*
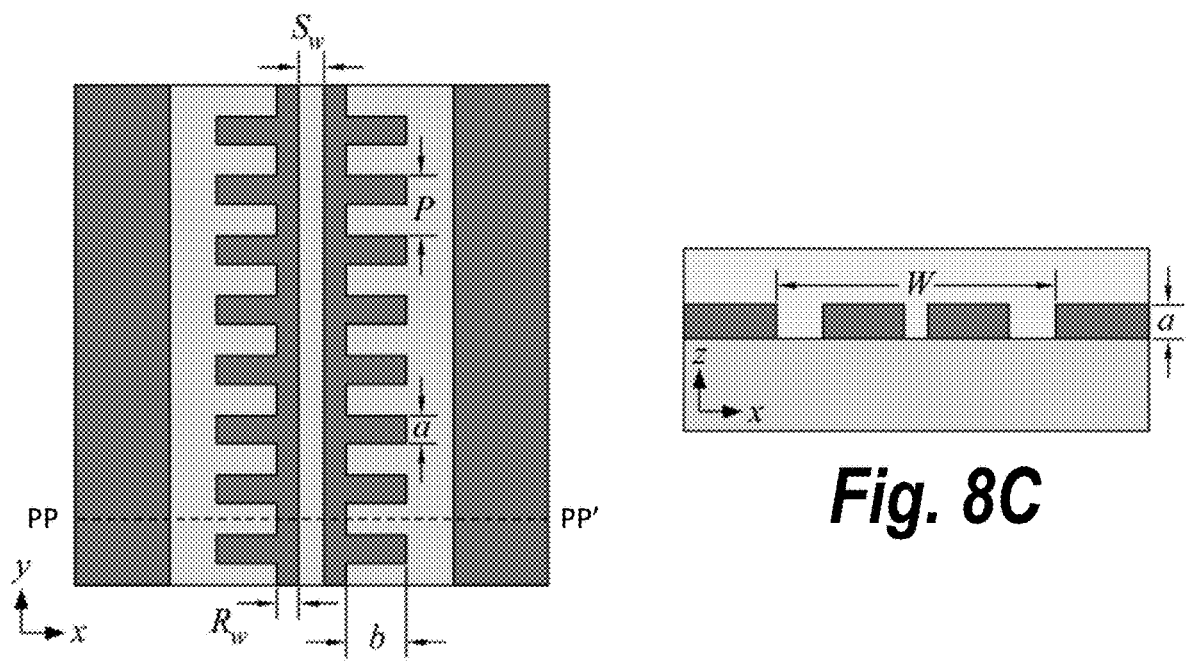
*Fig. 8B*
*Fig. 8C*

SLOT WAVEGUIDE WITH STRUCTURAL MODULATION

I. STATEMENT REGARDING FEDERALLY SPONSORED RESEARCH

The U.S. Government has a paid-up license in this invention and the right in limited circumstances to require the patent owner to license others on reasonable terms as provided for by the terms of the contract DE-SC0013178 awarded by Department of Energy (DOE), the contract FA9550-16-C-0033 awarded by Air Force Office of Scientific Research, and the contract FA8650-15-M-5006 awarded by Air Force Research Laboratory.

II. BACKGROUND

Field of the Invention

The present disclosure relates generally to the field of optical and sensing devices, and more specifically to an apparatus and method for optical communication, microwave communication, biological sensing, and chemical sensing.

Background of the Invention

The statements in this section merely provide background information related to the present disclosure and may not constitute prior art.

In recent decades, integrated photonics has received considerable attention because of its potentially revolutionary applications in a broad range of areas, especially optical interconnects and sensors. Various device structures have been proposed, but the underlying motivation to maximize the photon-matter interaction in both time and space domains within an extremely stringent chip surface remains the same. The slow light effect is frequently explored to extend the interaction duration, but the propagation loss is proportional to the slow down factor, which ultimately limits the maximum length of the slow light waveguide. To enhance the photon-matter interaction in space, optical guiding structures need to be tailored to maximize the portion of the mode that extends outside of the waveguide structure, making a slot waveguide a promising structure.

Such a waveguide structure may be used as a building block for a vast range of devices, such as optical communication devices, biosensors, and chemical sensors. One representative example is for silicon photonics modulators. High speed, high efficiency integrated electro-optic (EO) modulators built on silicon substrates are important building blocks for short-reach optical interconnects [G. Reed, G. Mashanovich, F. Gardes, and D. Thomson, Nat. Photonics 4, 518-526 (2010)]. Most silicon integrated EO modulators rely on plasma dispersion effects, in which the change of free carrier concentration induces a change of refractive index in the silicon waveguide [L. Liao, D. Samara-Rubio, M. Morse, A. Liu, D. Hodge, D. Rubin, U. D. Keil, and T. Franck, Opt. Express 13, 3129 (2005); W. M. Green, M. J. Rooks, L. Sekaric, and Y. a Vlasov, Opt. Express 15, 17106 (2007)]. The bandwidths and modulation efficiencies in these modulators are therefore limited by the free carrier dynamics. On the other hand, polymer EO materials possess the necessary properties, such as high nonlinear coefficients and ultrafast response times, to function in high-performance integrated modulators and thus attract more and more attention [B. Bortnik, Y.-C. Hung, H. Tazawa, B.-J. Seo, J. Luo, A. K.-Y. Jen, W. H. Steier, and H. R. Fetterman, IEEE J. Sel. Top. Quantum Electron. 13, 104-110 (2007); Y. Enami, C. T. Derose, D. Mathine, C. Loychik, C. Greenlee, R. A. Norwood, T. D. Kim, J. Luo, Y. Tian, A. K.-Y. Jen, and N. Peyghambarian, Nat. Photonics 1, 180-185 (2007). M. Lee, Science, 298, 1401-1403 (2002)]. The silicon-organic hybrid platform combines advantages of both silicon photonics and polymer materials, enabling large modulation bandwidth and small voltage-length product simultaneously in EO modulation applications.

In silicon-organic hybrid modulators, the EO effect is realized in EO polymer materials when the guided wave interacts with polymer claddings. Silicon-organic hybrid EO modulators based on various phase shifter designs have been reported in recent years. These structures include slot waveguides [R. Palmer, S. Koeber, D. L. Elder, M. Woessner, W. Heni, D. Korn, M. Lauermann, W. Bogaerts, L. Dalton, W. Freude, J. Leuthold, and C. Koos, J. Light. Technol. 32, 2726-2734 (2014)], two-dimensional (2D) slot photonic crystal (PC) waveguides [X. Zhang, A. Hosseini, S. Chakravarty, J. Luo, A. K.-Y. Jen, and R. T. Chen, Opt. Lett. 38, 4931 (2013); X. Wang, C.-Y. Lin, S. Chakravarty, J. Luo, A. K.-Y. Jen, and R. T. Chen, Opt. Lett. 36, 882 (2011)], and one-dimensional (1D) PC waveguides [S. Inoue and A. Otomo, Appl. Phys. Lett. 103, 171101 (2013)]. High modulation efficiencies have been achieved in slot waveguides because slot waveguides confine the optical mode in the low index slot region infiltrated with EO polymer material, which leads to large mode volume overlap with the EO polymer. However, due to low poling efficiency in the narrow slot, the effective in-device EO coefficient is far away from its maximum potential value. A slow light waveguide, like a 2D slot PC waveguide has been proposed and demonstrated with effective $r_{33}$ of 700 pm/V within specific wavelength ranges (slow light region). In a 2D slot PC waveguide, however, the optical loss in the slow light region and its robustness to fabrication variations, considering its complicated structure and delicate arrangement of the PC holes, is a concern, especially in a dispersion-engineered PC slot waveguide [X. Zhang, A. Hosseini, S. Chakravarty, J. Luo, A. K.-Y. Jen, and R. T. Chen, Opt. Lett. 38, 4931 (2013)]. Reports have shown that the propagation loss in a 2D PC slot is very sensitive to slot width variations [A. Di Falco, M. Massari, M. G. Scullion, S. A. Schulz, F. Romanato, and T. F. Krauss, IEEE Photonics J. 4, 1536-1541 (2012)].

In order to compare the optical performance of all the phase shifter designs, a figure-of-merit $f=\sigma \cdot n_g \cdot L_{3dB}$ is proposed, where a is the ratio of optical mode in the EO polymer region, $L_{3dB}$ is the length of phase shifter in millimeters with 3 dB propagation loss. In conventional slot waveguide based EO modulators, like the ones disclosed in Palmer et al. and Baehr-Jones et al. [R. Palmer, S. Koeber, D. L. Elder, M. Woessner, W. Heni, D. Korn, M. Lauermann, W. Bogaerts, L. Dalton, W. Freude, J. Leuthold, and C. Koos, J. Light. Technol. 32, 2726-2734 (2014); T. Baehr-Jones, B. Penkov, J. Huang, P. Sullivan, J. Davies, J. Takayesu, J. Luo, T. D. Kim, L. Dalton, A. Jen, M. Hochberg, and A. Scherer, Appl. Phys. Lett. 92, 1-4 (2008); R. Palmer, L. Alloatti, D. Korn, P. C. Schindler, R. Schmogrow, W. Heni, S. Koenig, J. Bolten, T. Wahlbrink, M. Waldow, H. Yu, W. Bogaerts, P. Verheyen, G. Lepage, M. Pantouvaki, J. Van Campenhout, P. Absil, R. Dinu, W. Freude, C. Koos, and J. Leuthold, IEEE Photonics J. 5, (2013)], f~0.4×2× 0.75~0.6, considering a typical propagation loss of 4 dB/mm when filled with EO polymer [R. Palmer, S. Koeber, D. L. Elder, M. Woessner, W. Heni, D. Korn, M. Lauermann, W.

Bogaerts, L. Dalton, W. Freude, J. Leuthold, and C. Koos, J. Light. Technol. 32, 2726-2734 (2014)].

The waveguide structure may also be used for applications that can benefit from the photon-matter interaction enhancement. These applications include but are not limited to high performance switches, modulators, biosensors, chemical sensors, and absorption spectroscopy.

III. SUMMARY

In one respect, disclosed is a slow light slot waveguide with PC structure along the rails. Such a PC structure takes advantage of the strong mode confinement in the low-index region of a conventional slot waveguide together with the slow light enhancement from the PC structures. Its simple geometry makes it robust to fabrication imperfections and helps reduce the propagation loss, while still maintaining the benefits of large mode overlap and slow light enhancement. Using the structure as a phase shifter and converting the phase shift to amplitude modulation through a Mach-Zehnder interferometer (MZI) structure, an integrated silicon-organic hybrid EO modulator is disclosed. The observed effective EO coefficient is as high as 490 pm/V at 1562 nm wavelength. The measured half wave voltage and length product is 0.91 V. cm and may be further improved by adding narrow connecting arms. The disclosed structure offers a competitive, novel phase shifter design, which is simple, highly efficient and with low optical loss, for on-chip silicon-organic hybrid EO modulators.

In another respect, disclosed is an apparatus for communication or sensing comprising: a substrate; a bottom cladding disposed on the substrate; a device layer disposed on the bottom cladding, wherein the device layer comprises: two substantially parallel rails extending from an input side to an output side of the device layer and configured to form a slot between the two substantially parallel rails, wherein each of the two substantially parallel rails comprises an inner edge adjacent to the slot and an outer edge opposite the slot; and one or more teeth coupled to each of the two substantially parallel rails; and a top cladding disposed onto the device layer and bottom cladding; wherein the bottom cladding, the device layer, and the top cladding are configured to support at least one optical guided mode.

In yet another respect, disclosed is an apparatus for communication or sensing comprising: a substrate; a bottom cladding disposed on the substrate; a device layer disposed on the bottom cladding, wherein the device layer comprises: two substantially parallel rails extending from an input side to an output side of the device layer and configured to form a slot between the two substantially parallel rails, wherein each of the two substantially parallel rails comprises an inner edge adjacent to the slot and an outer edge opposite the slot; and one or more teeth coupled to each of the two substantially parallel rails; a top cladding disposed onto the device layer and bottom cladding; an input taper coupled to the input side of the device layer and an output taper coupled to the output side of the device layer; an input inverse taper coupler coupled to the input taper opposite the device layer and an output inverse taper coupler coupled to the output taper opposite the device layer; a bulk device layer region; one or more connecting bars coupled to the one or more teeth and the bulk device layer; and a bowtie antenna configured to concentrate an electrical field of an electromagnetic wave onto the device layer from the input side to the output side of the device layer; wherein the bottom cladding, the device layer, and the top cladding are configured to support at least one optical guided mode.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure. Other objectives and advantages of the present invention will become apparent from the following descriptions, taken in connection with the accompanying drawings, wherein, by way of illustration and example, an embodiment of the present invention is disclosed.

IV. BRIEF DESCRIPTION OF THE DRAWINGS

The drawings constitute a part of this specification and include exemplary embodiments of the present invention, which may be embodied in various forms. The drawings described herein are for illustrative purposes only of selected embodiments and not of all possible implementations, and are not intended to limit the scope of the present disclosure in any way. It is to be understood that in some instances, various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein.

Figure 1A:
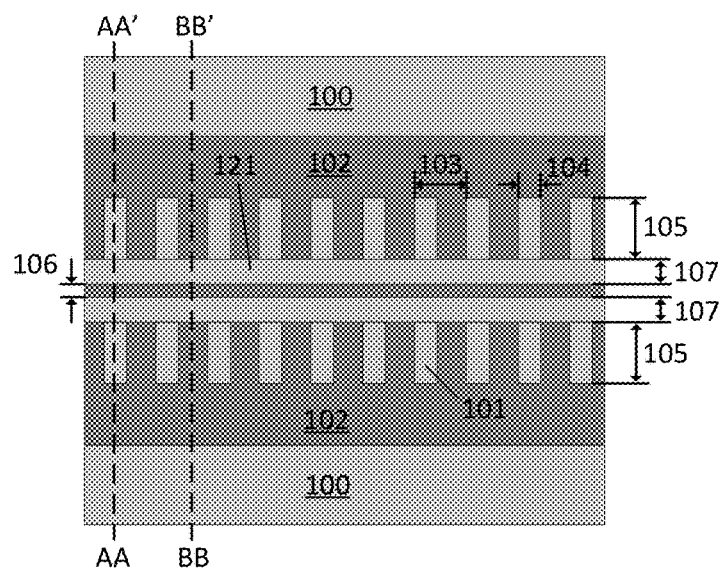
FIG. 1A is a top view schematic drawing of the 1D slot photonic crystal waveguide, in which the periodic perturbation is introduced by adding bars on the outer edges of the rails, in accordance with some embodiments.
Figure 2A:
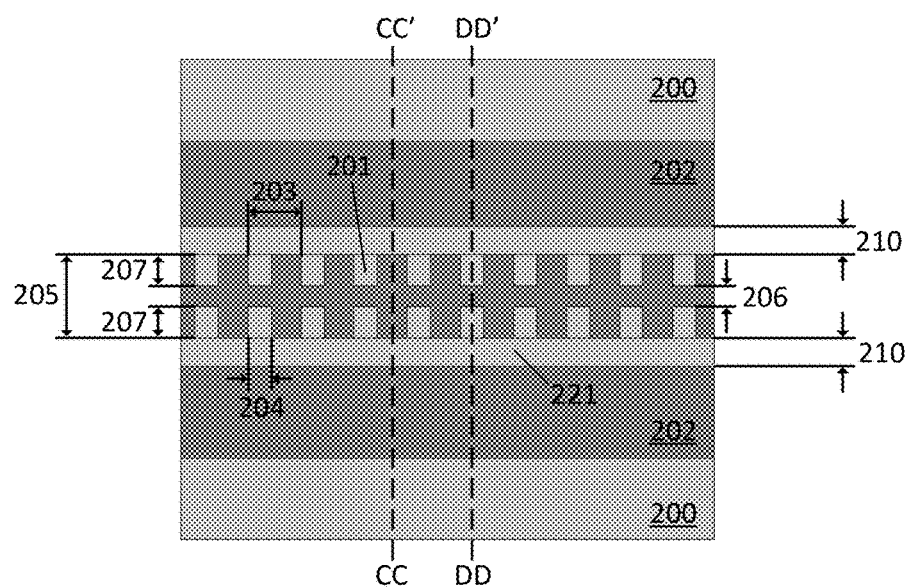
FIG. 2A is a top view schematic drawing of the 1D slot photonic crystal waveguide, in which bars are added periodically on the inner edge of the slot, in accordance with some embodiments.
Figure 3A:
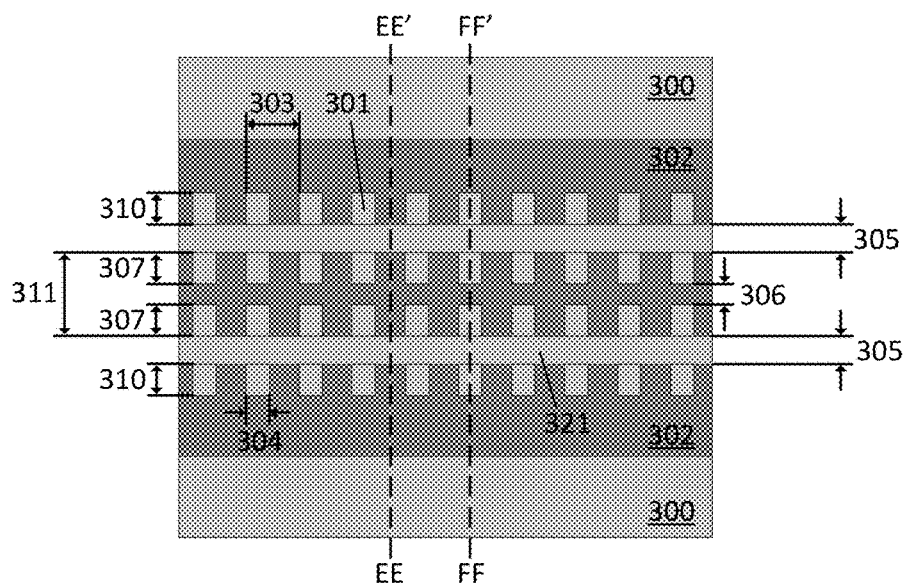
FIG. 3A is a top view schematic drawing of the 1D slot photonic crystal waveguide, in which bars are added periodically on the outer edges of the rails and the inner edge of the slot, in accordance with some embodiments.
Figure 4A:
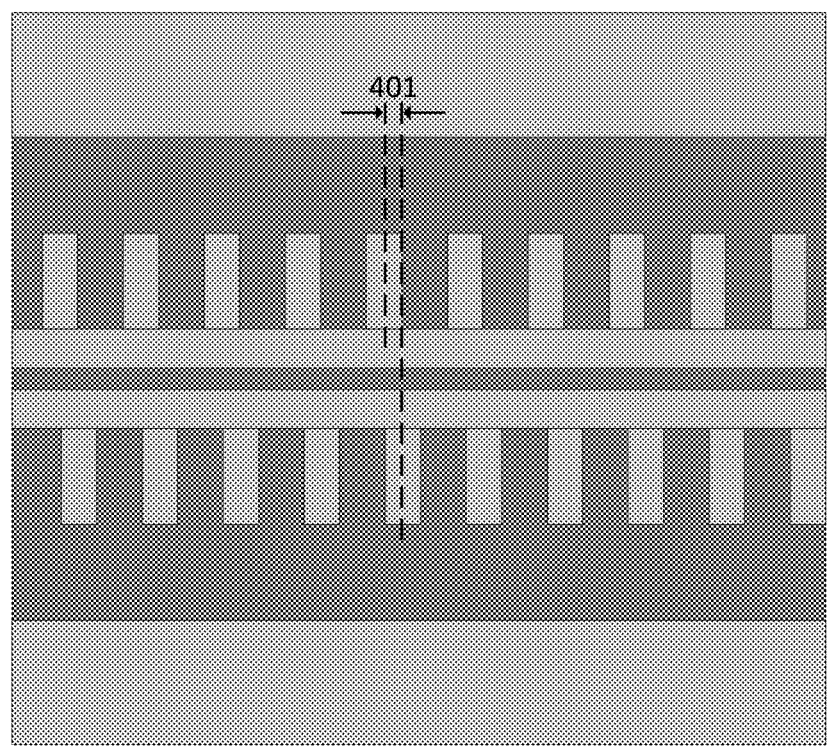
Figure 4B:
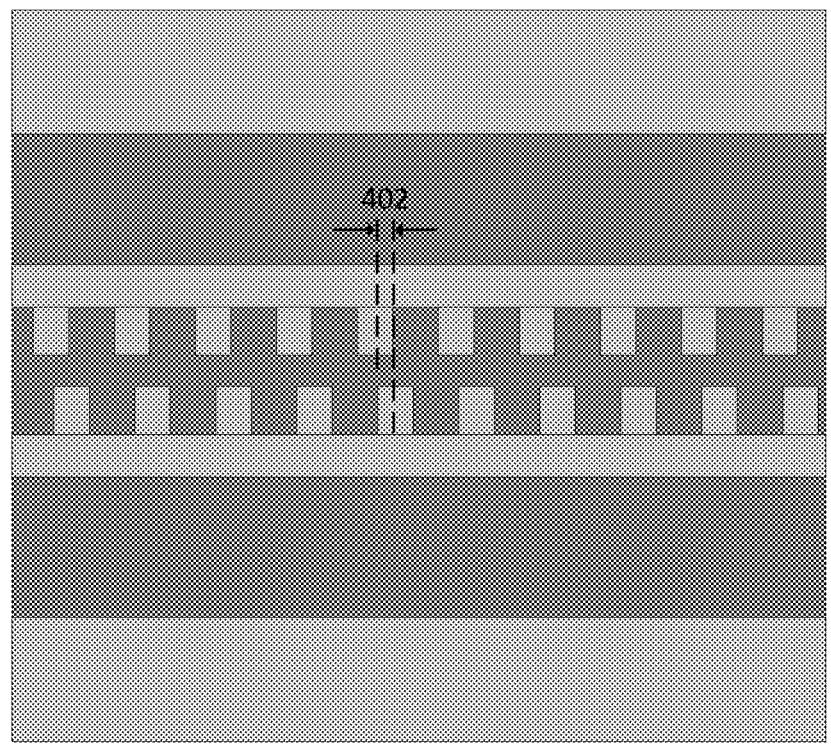
Figure 4C:
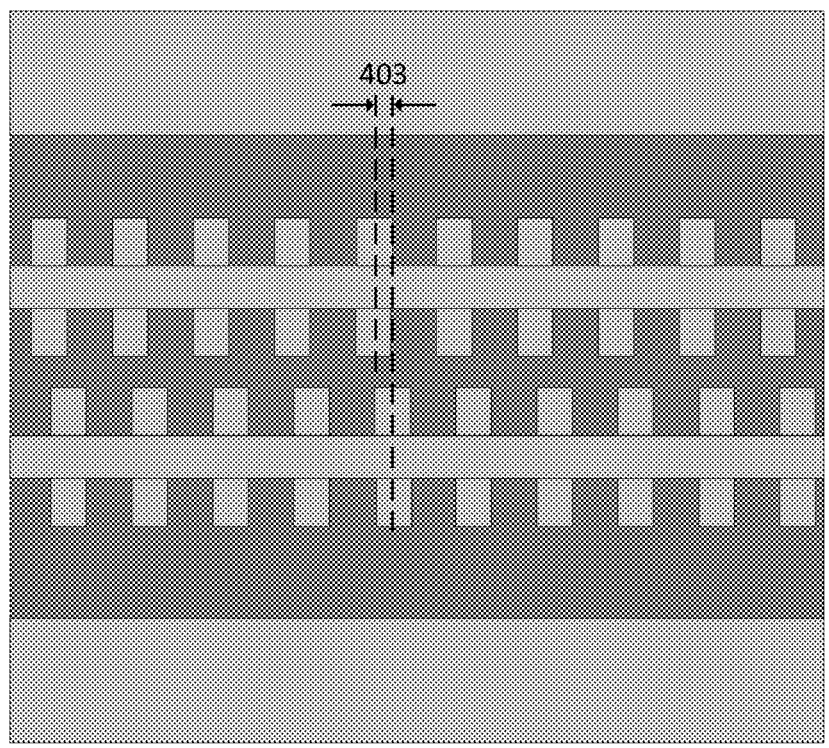
Figure 4D:
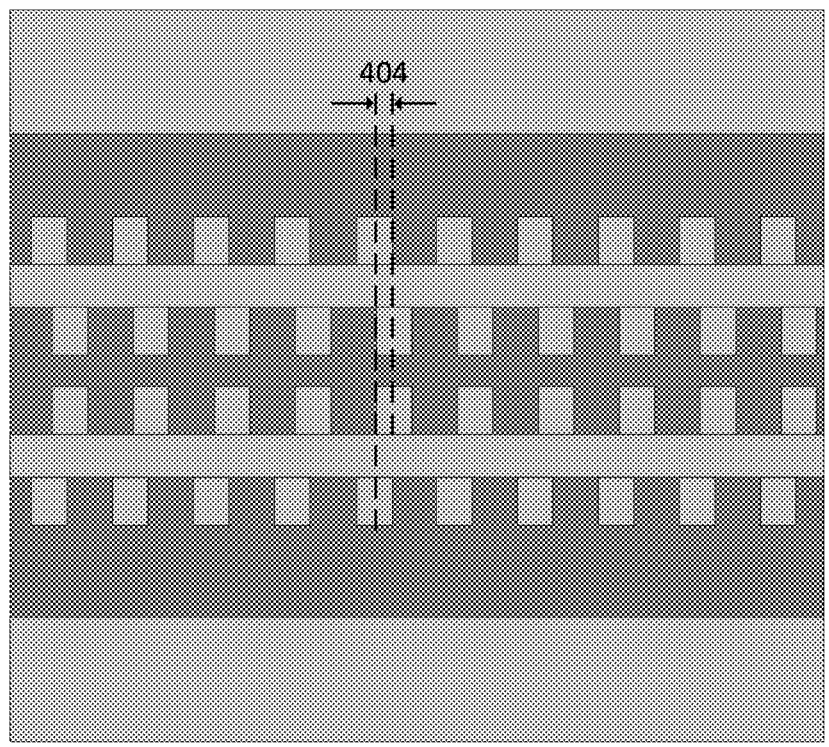

FIGS. 4A-4D show that phase shift may be added into the embodiments illustrated in FIG. 1A, FIG. 2A, FIG. 3A, and FIG. 3A, respectively, to tune the optical properties of the 1D slot photonic crystal waveguide. FIG. 4A, FIG. 4B, and FIG. 4C illustrate the structural phase shift applied to the periodic bars on one rail. FIG. 4D illustrates another embodiment in which the phase shift is applied between the inner and outer bars.

Figure 5A:
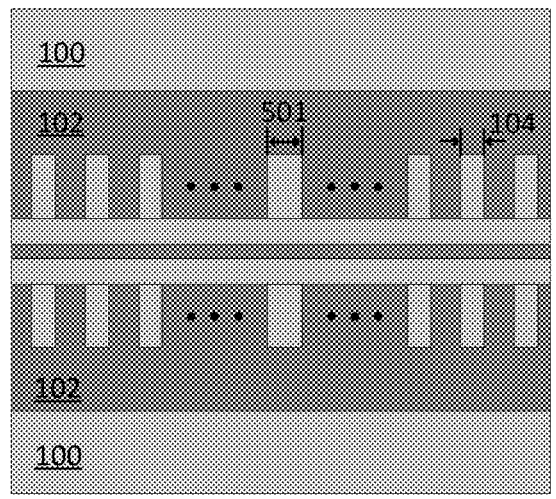
Figure 5B:
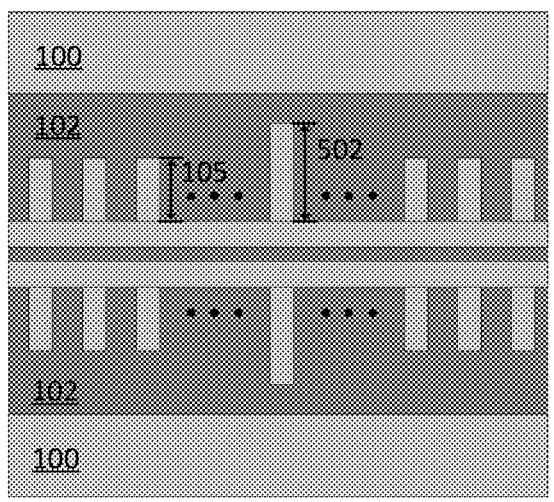
Figure 5C:
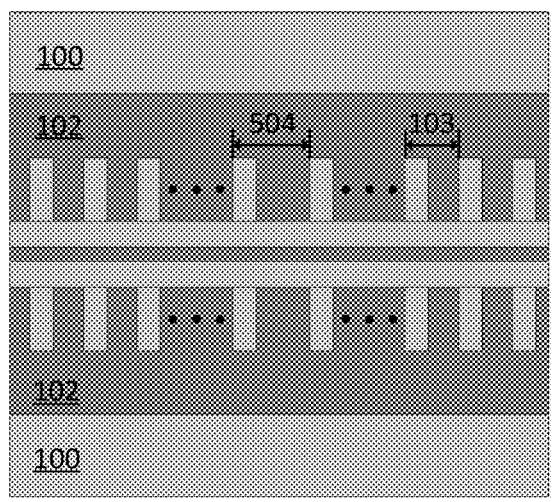
Figure 5D:
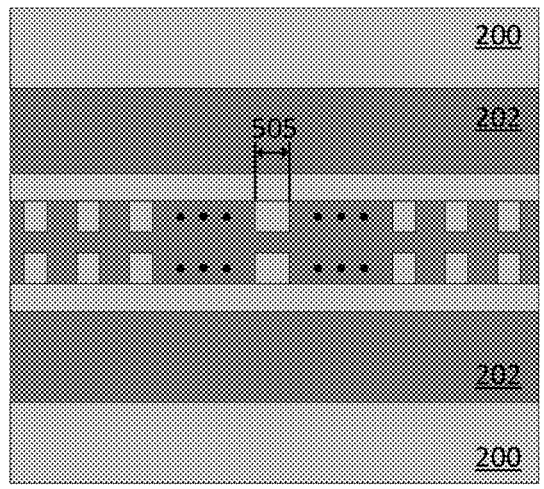
Figure 5E:
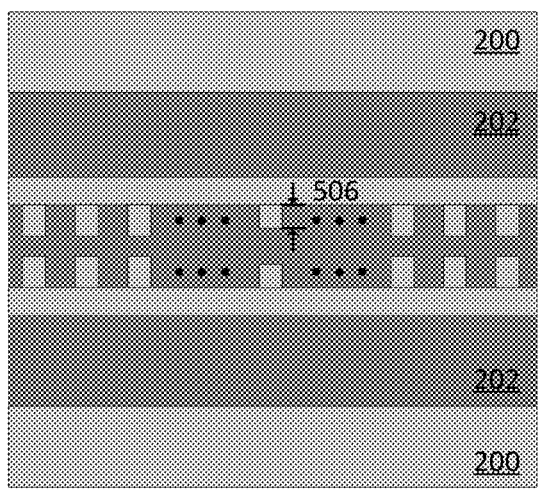
Figure 5F:
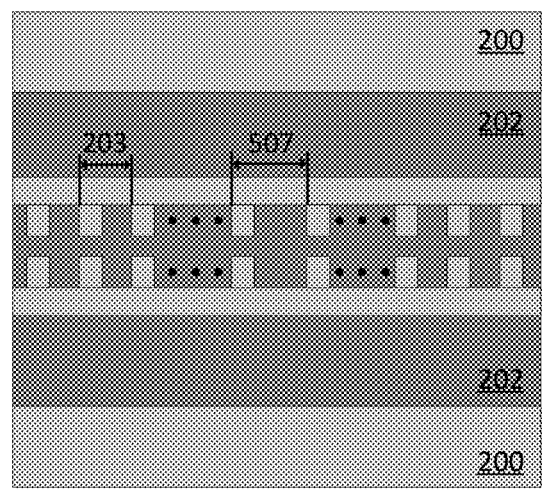
Figure 5G:
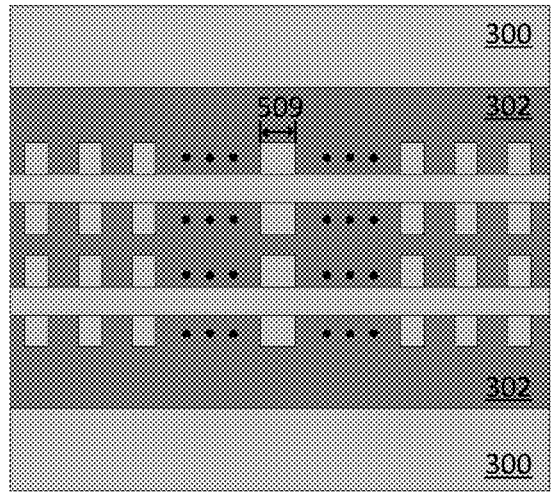
Figure 5H:
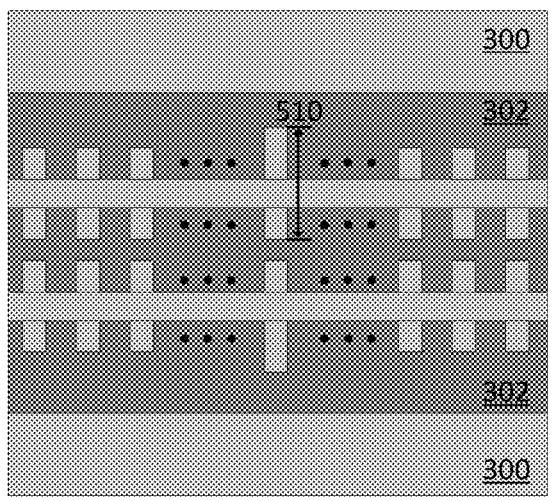
Figure 5J:
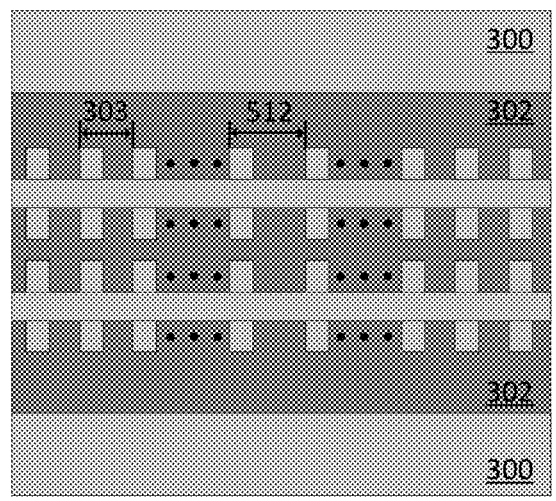

FIGS. 5A, 5B, 5C, 5D, 5E, 5F, 5G, 5H, and 5J show that a resonance cavity may be created in the 1D slot photonic crystal waveguide through varying the width, length, and/or period of one or more bars in the embodiments illustrated in FIG. 1A, FIG. 2A, and FIG. 3A. FIG. 5A, FIG. 5B, and FIG. 5C are schematic drawings of the 1D photonic crystal slot cavity generated by tuning the width, length, or period, respectively, of the bars of the waveguide illustrated in FIG. 1A. FIG. 5D, FIG. 5E, and FIG. 5F are schematic drawings of the 1D photonic crystal slot cavity generated by tuning the width, length, or period of the bars of the waveguide illustrated in FIG. 2A. FIG. 5G, FIG. 5H, and FIG. 5J are schematic drawings of the 1D photonic crystal slot cavity generated by tuning the width, length, or period of the bars of the waveguide illustrated in FIG. 3A.

Figure 6A:
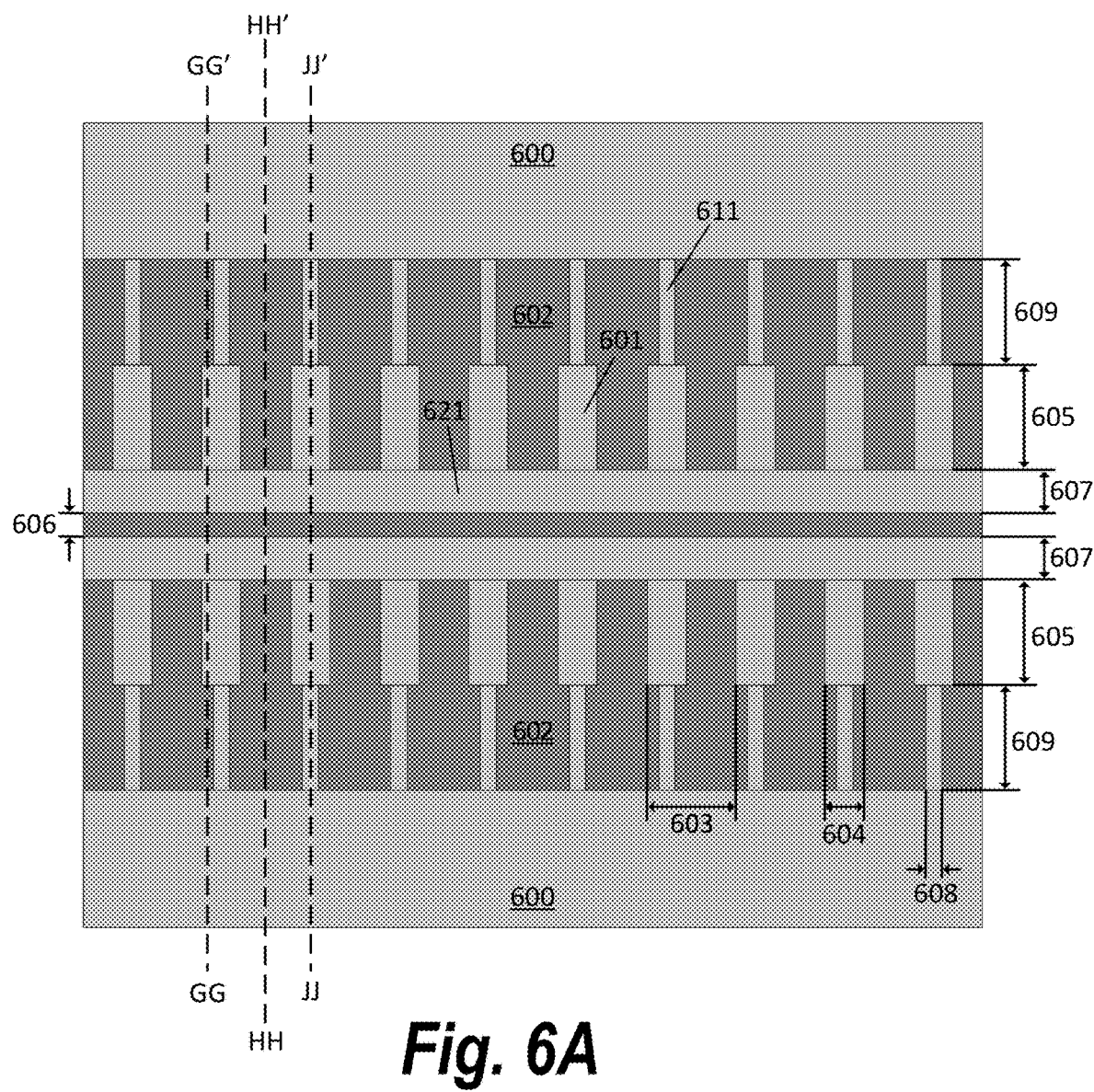
Figure 6B:
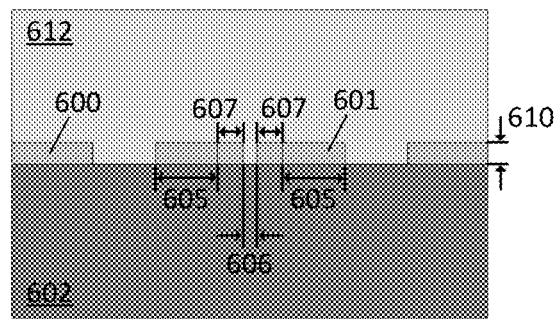
Figure 6C:
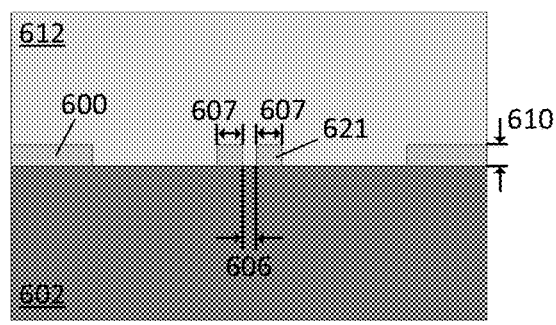
Figure 6D:
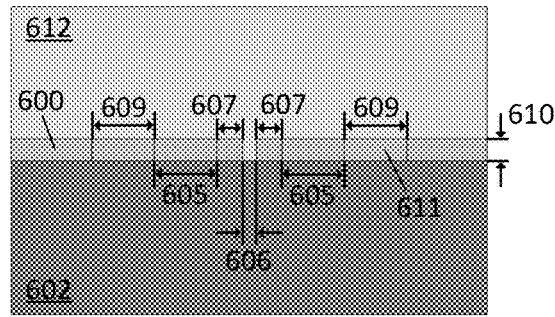

FIG. 6A is a top view schematic drawing of the 1D slot photonic crystal waveguide with narrower bars connect the bars to the peripheral silicon, in accordance with some embodiments. FIG. 6B, FIG. 6C, and FIG. 6D are the cross-sections taken along the dashed lines GG-GG', HH-HH', and JJ-JJ' of FIG. 6A, respectively.

Figure 7A:
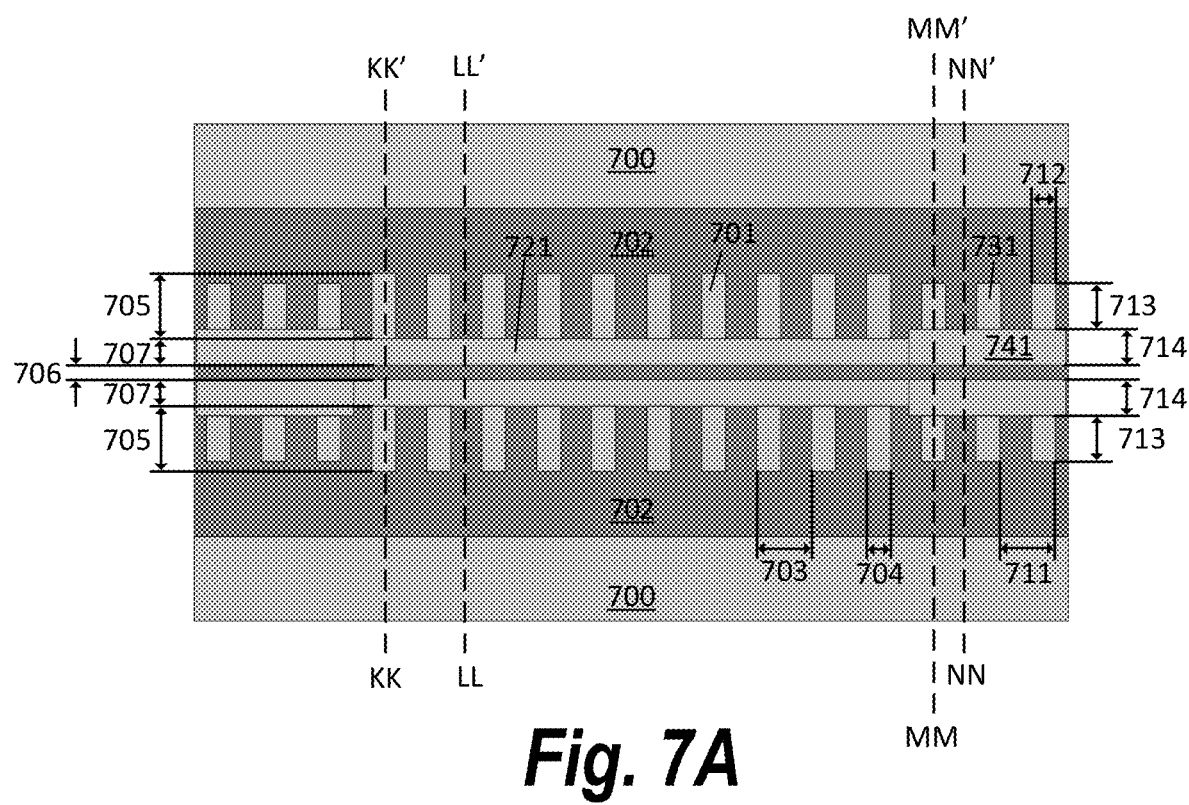
Figure 7B:
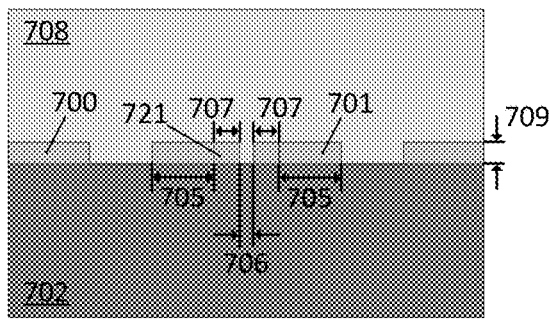
Figure 7C:
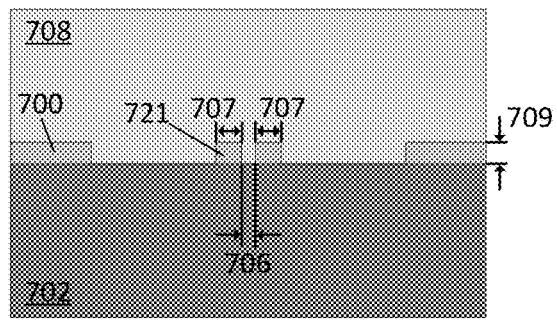
Figure 7D:
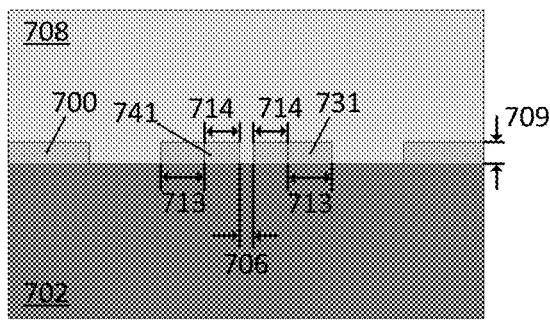
Figure 7E:
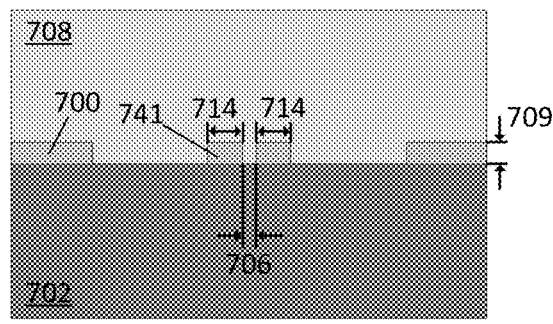

FIG. 7A is a top view schematic drawing of the 1D slot photonic crystal waveguide with step tapers on the two ends of the waveguide, in accordance with some embodiments. FIG. 7B, FIG. 7C, FIG. 7D, and FIG. 7E are the cross-sections taken along the dashed lines KK-KK', LL-LL', MM-MM', and NN-NN' of FIG. 7A, respectively.

FIG. 8A shows an isometric cutaway schematic of a 1D slot photonic crystal waveguide, in accordance with some embodiments. FIG. 8B is a top view schematic drawing of the 1D slot photonic crystal waveguide of FIG. 8A. FIG. 8C is the cross-section taken along the dashed line PP-PP' of FIG. 8B.

Figure 9A:
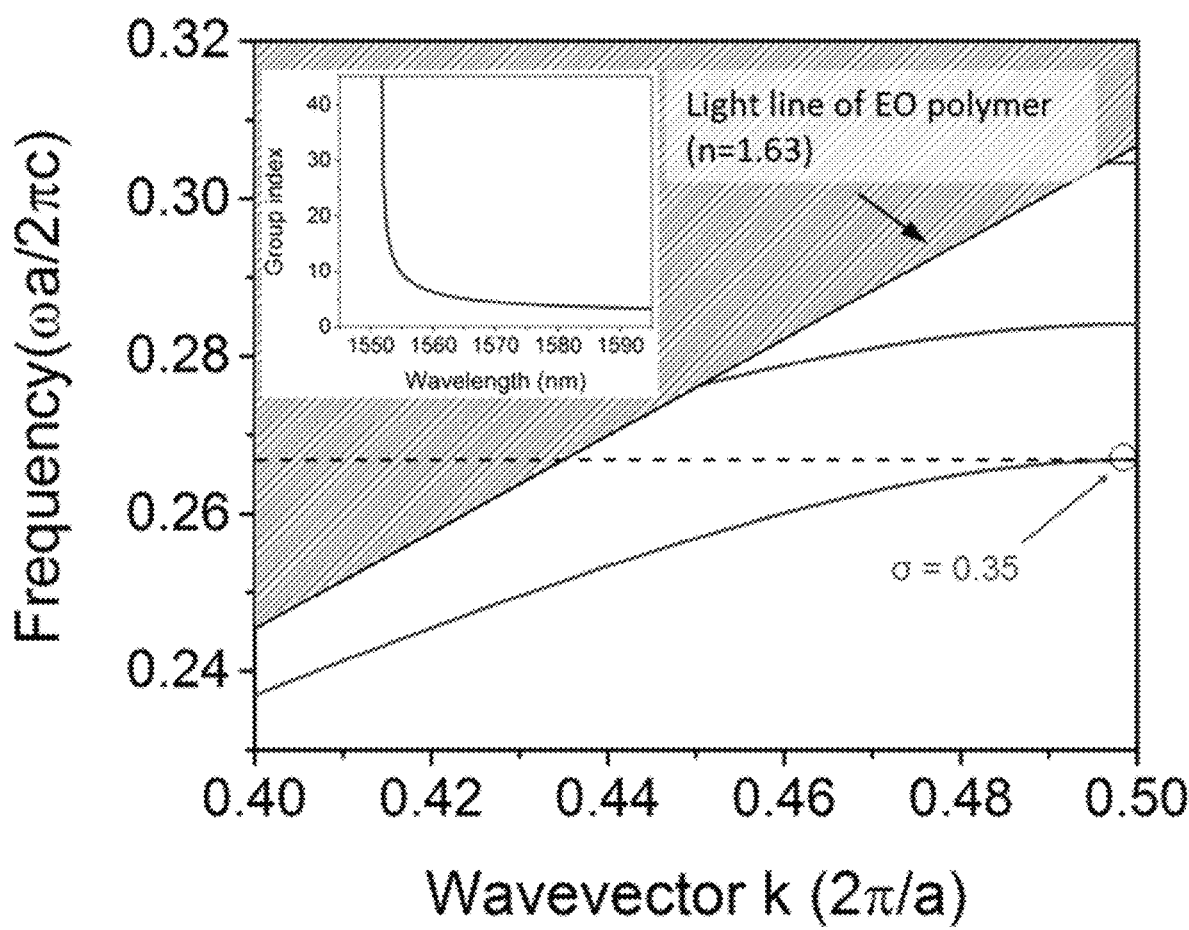
Figure 9C:
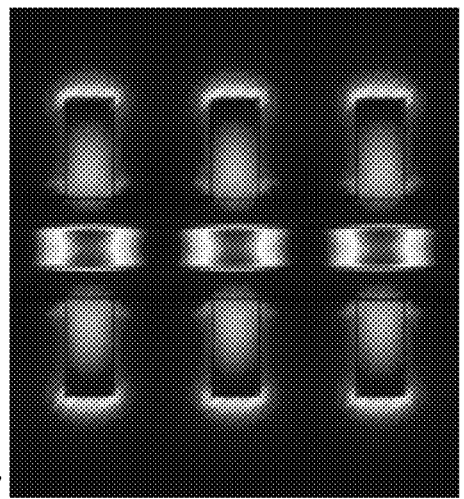
Figure 9B:
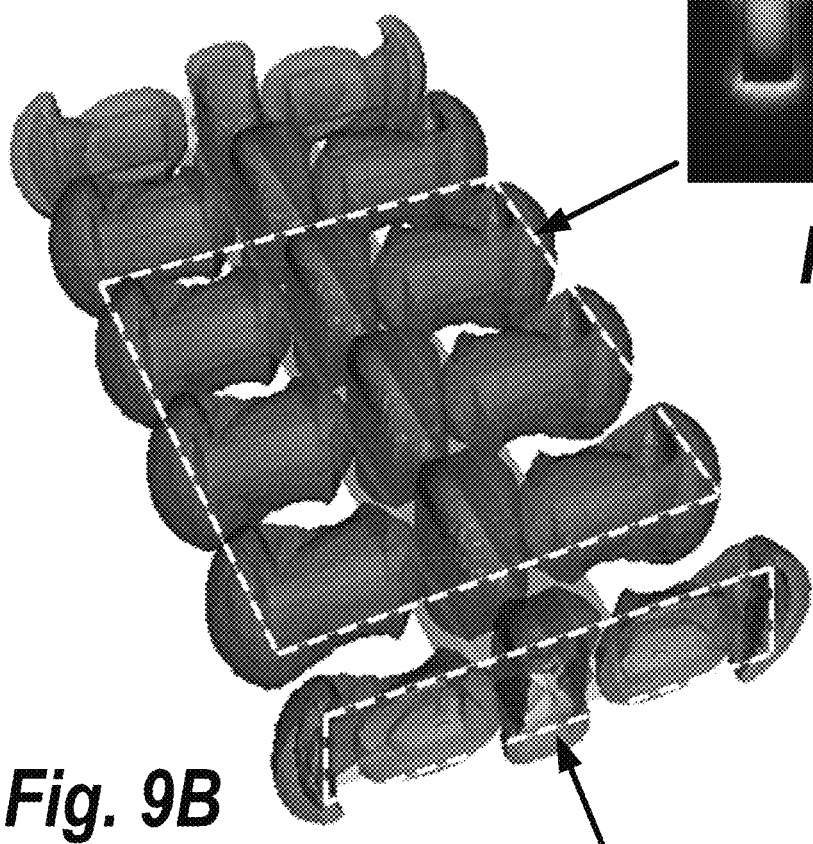
Figure 9D:
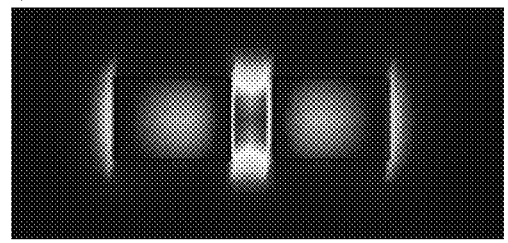

FIG. 9A is the band diagram of a 1D slot photonic crystal waveguide, in accordance with some embodiments. The inset graph is the corresponding group index for the fundamental band. FIG. 9B is the mode profile of the modes on the fundamental band. FIG. 9C and FIG. 9D are the mode profiles of a horizontal cut plane and a vertical cross-section, respectively, of FIG. 9B.

Figure 10:
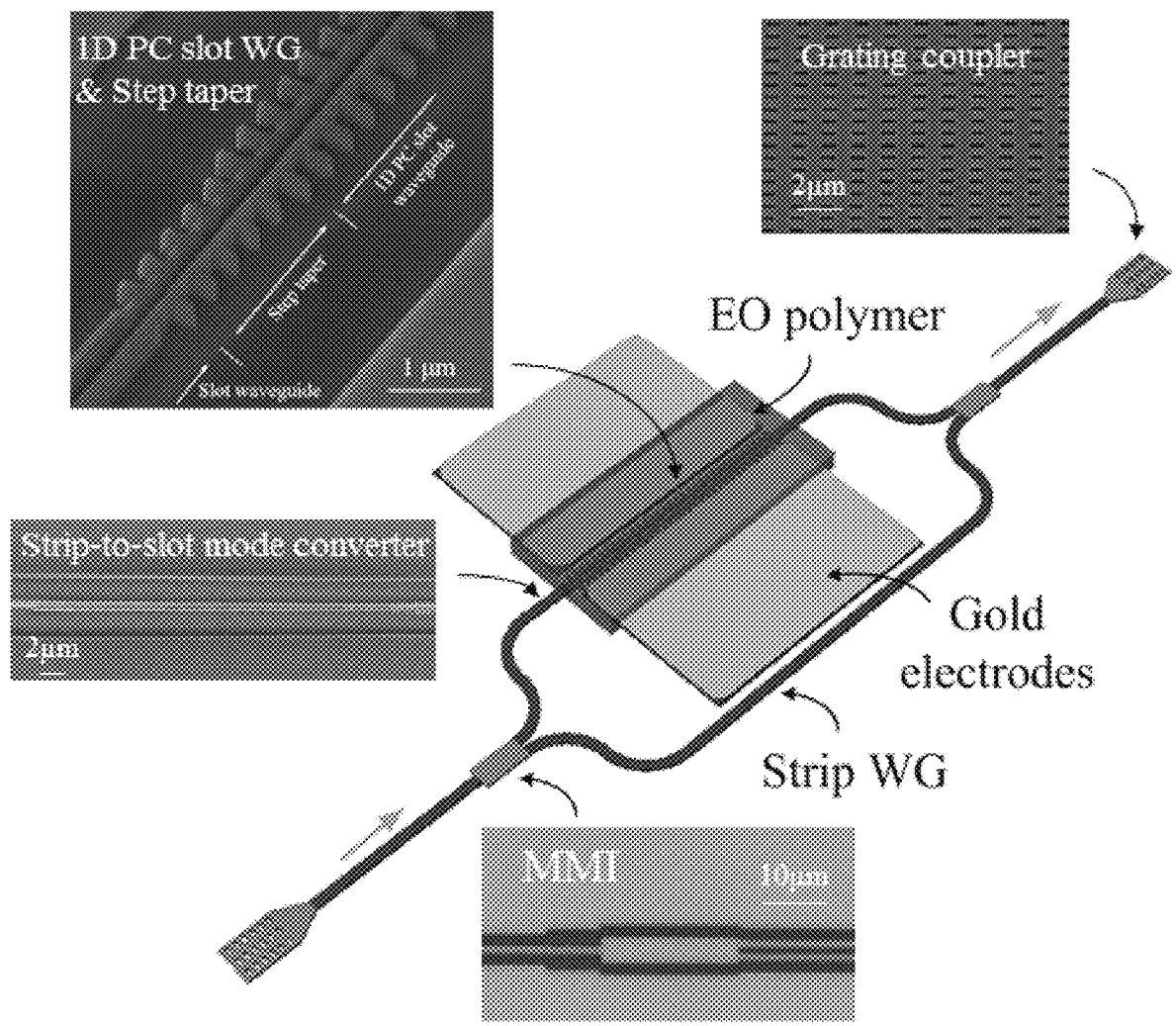

FIG. 10 shows a representative modulator structure, in accordance with some embodiments. One arm of the modulator is loaded with the slow light waveguide. SEM pictures of the device are shown by the insets.

Figure 11A:
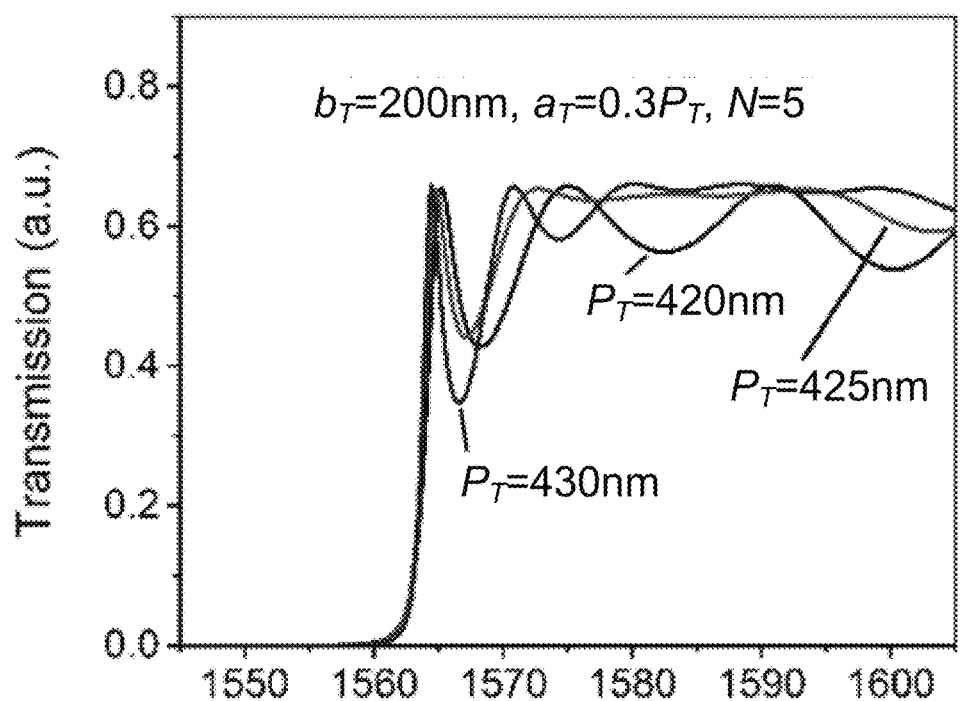
Figure 11B:
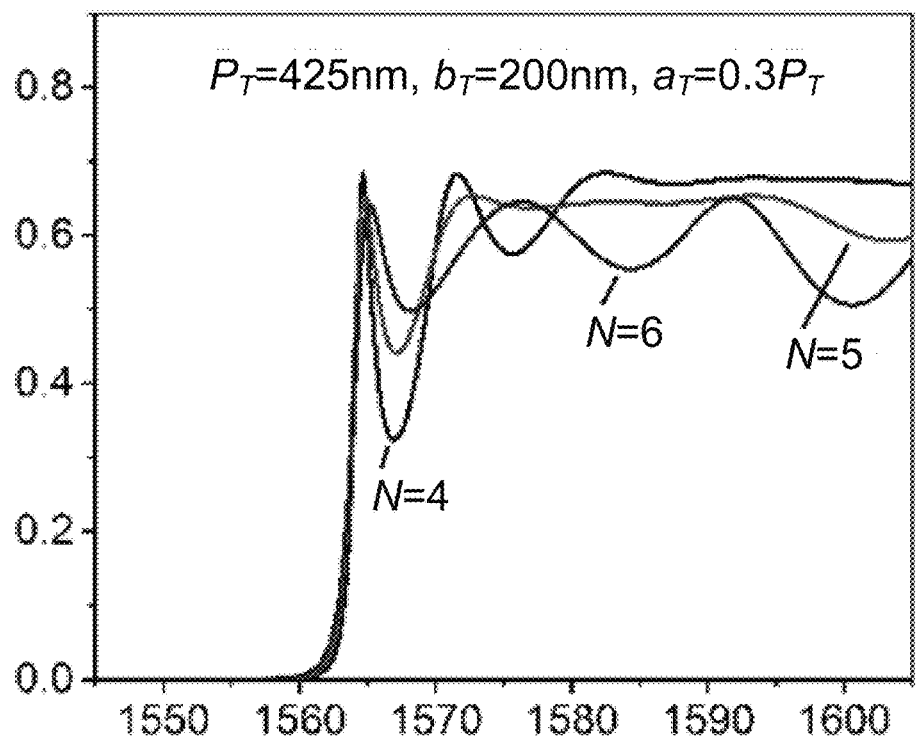
Figure 11C:
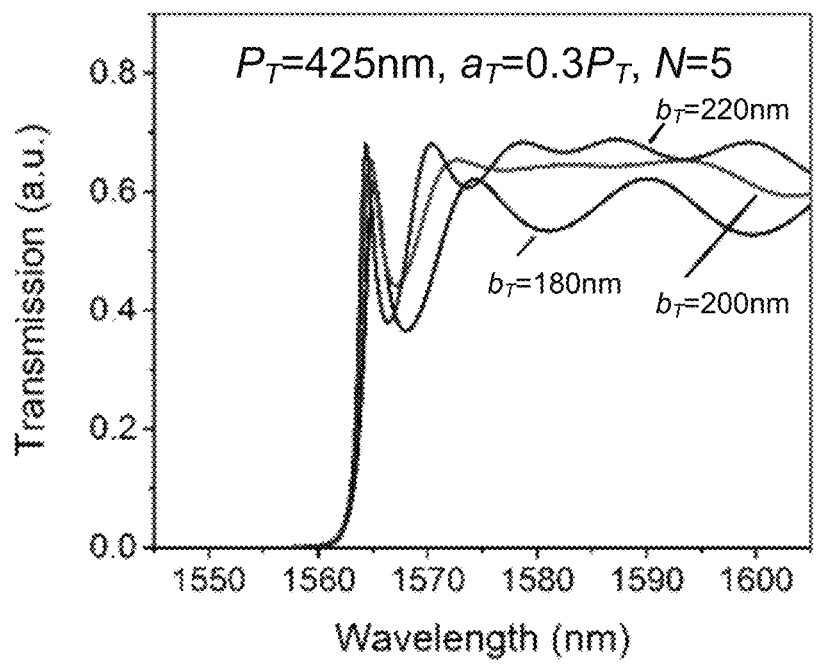
Figure 11D:
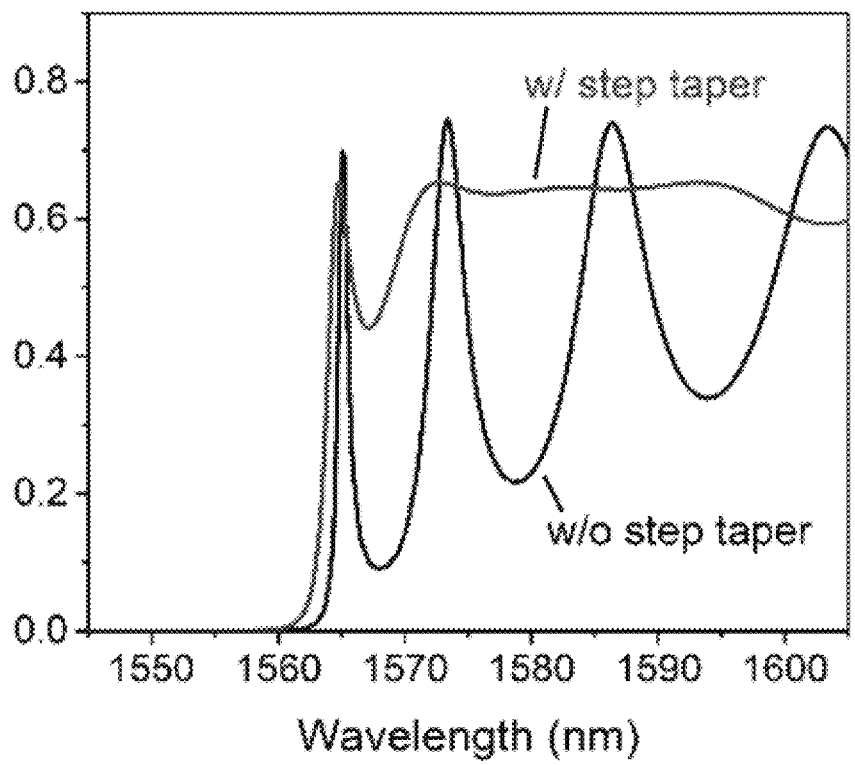
Figure 11E:
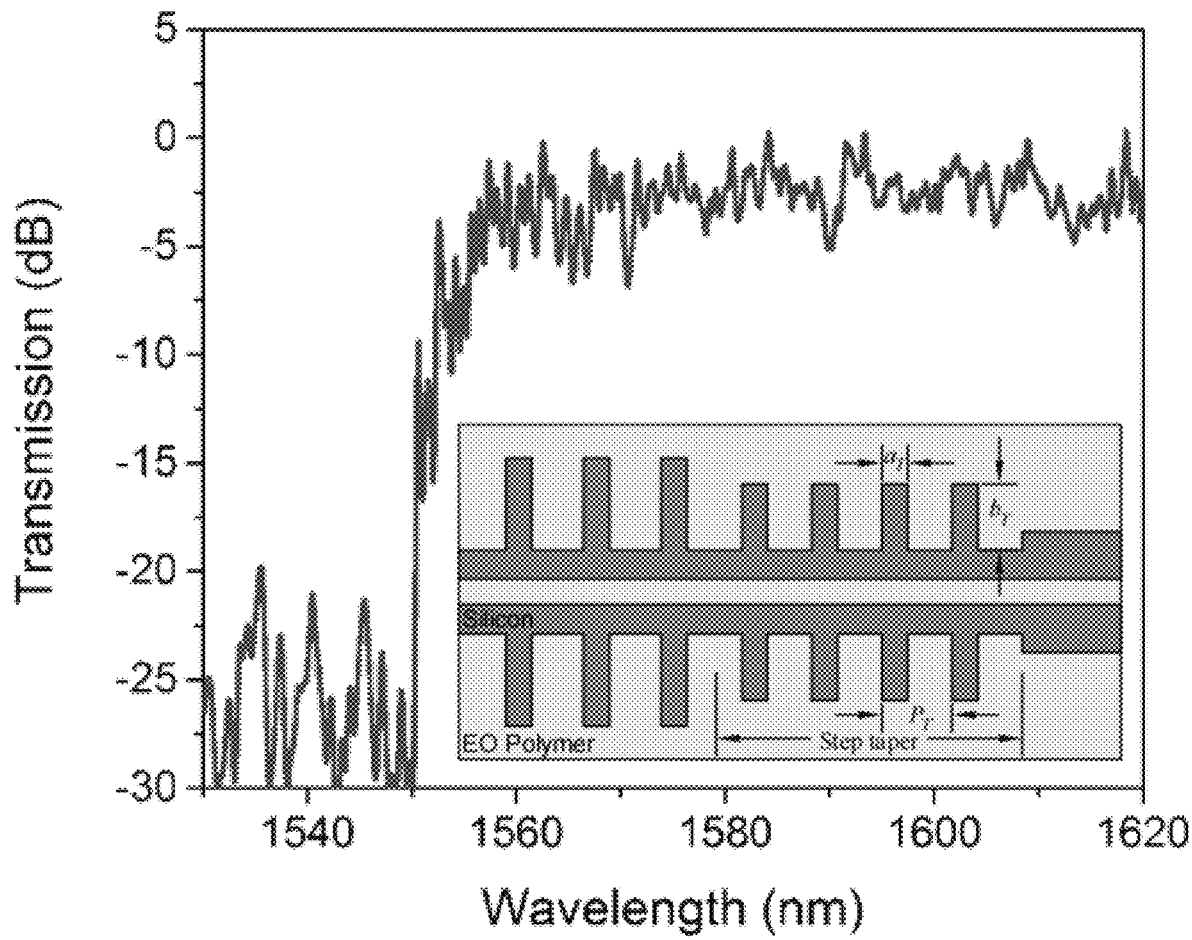

FIGS. 11A-11D are the simulation results of the step tapers. FIG. 11E is a graph of the experimental results of a disclosed step taper, in accordance with some embodiments.

Figure 12A:
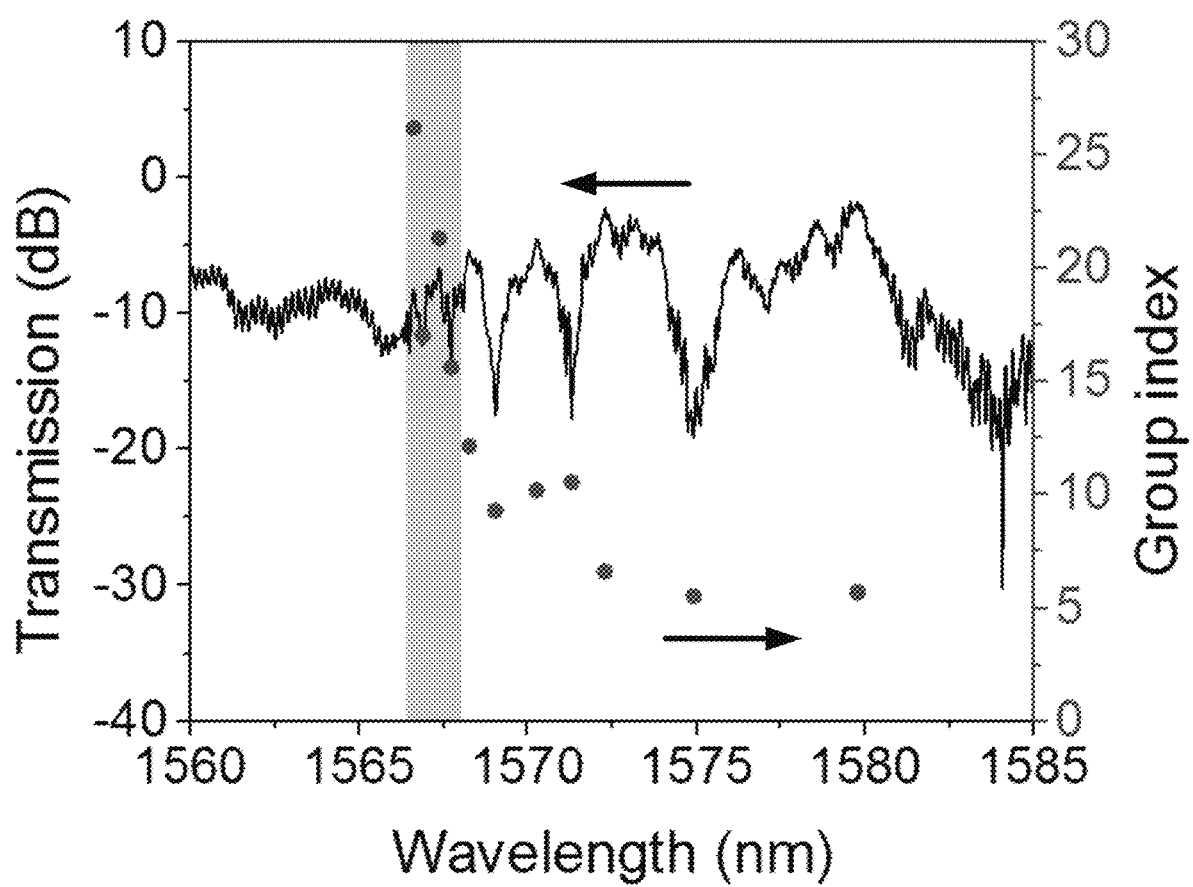
Figure 12B:
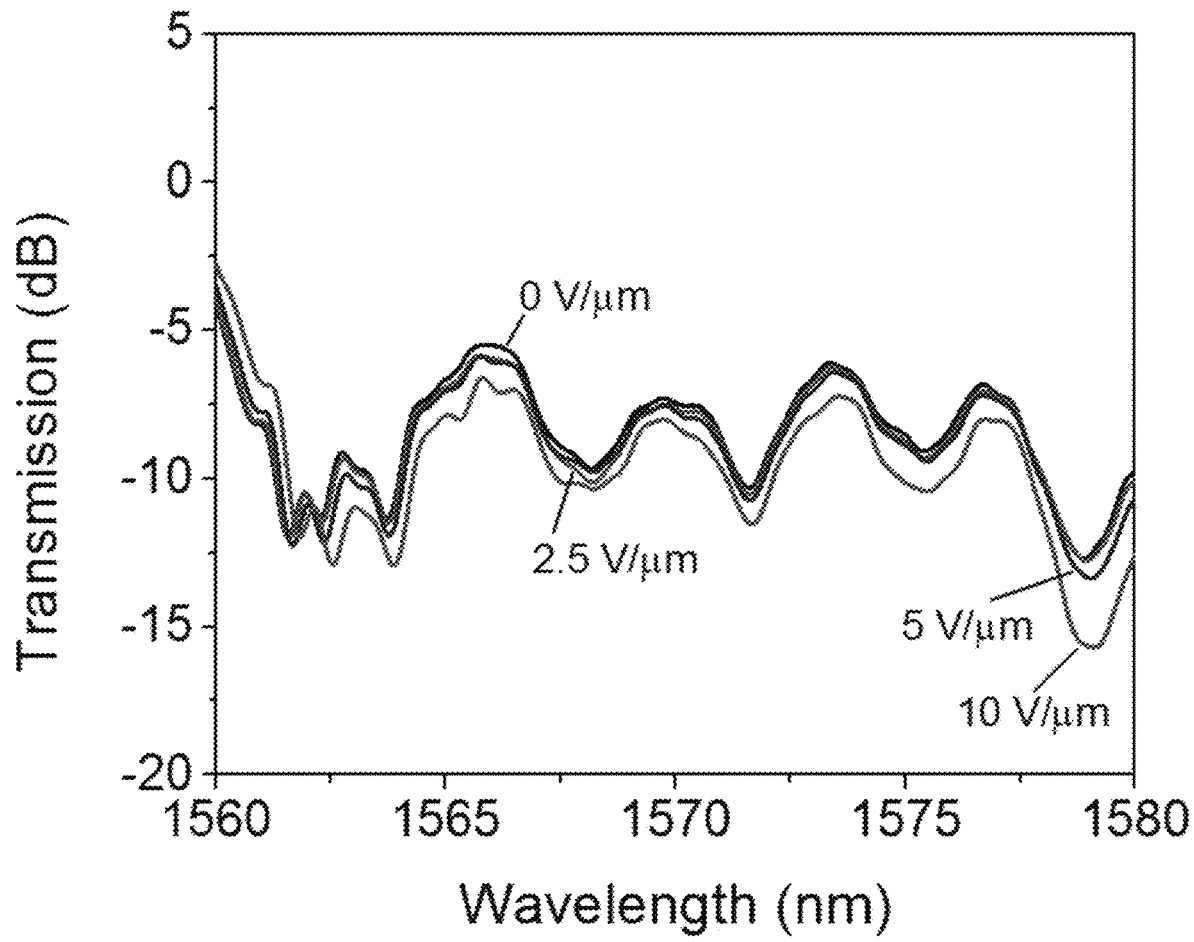
Figure 12C:
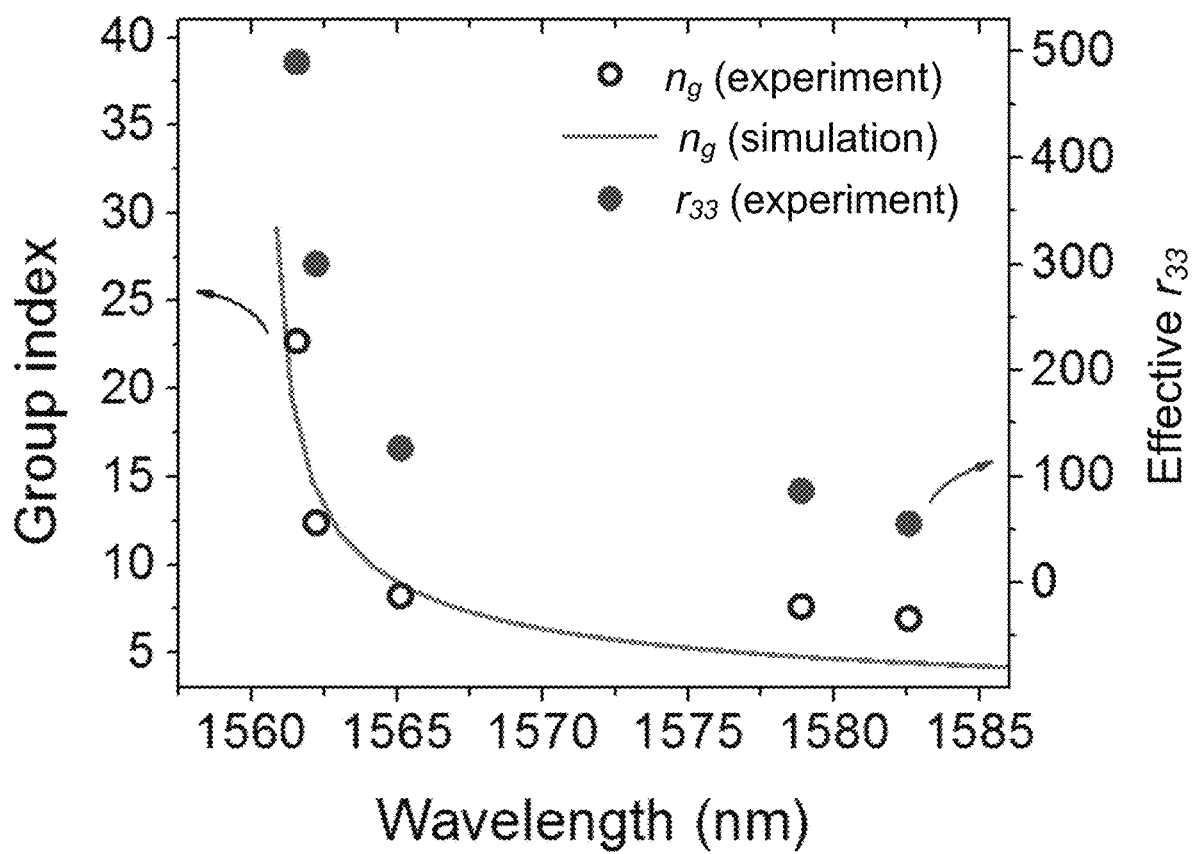

FIG. 12A is the transmission spectrum of the asymmetric MZI and the corresponding group index extracted from the interference pattern of the MZI. FIG. 12B is the transmission spectrum shift when different bias voltages are applied. FIG. 12C shows the experimental and simulated group indices and the $r_{33}$.

Figure 13A:
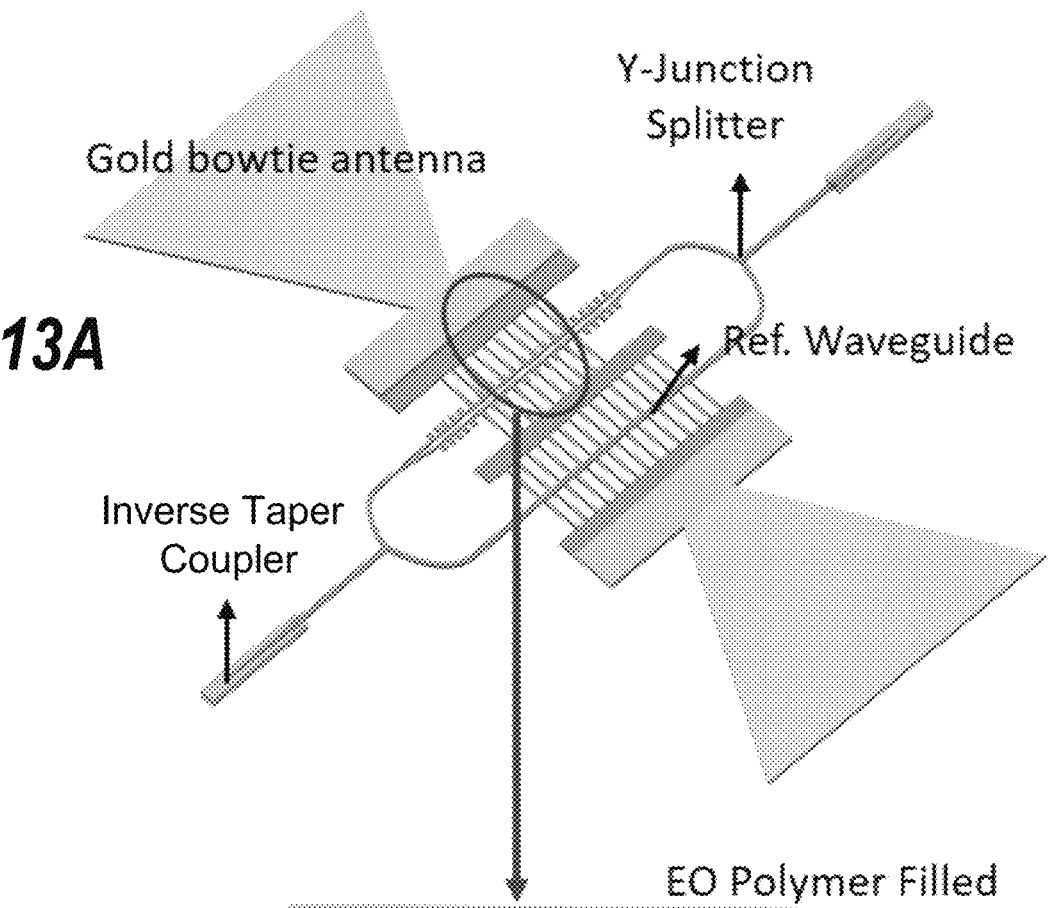
Figure 13B:
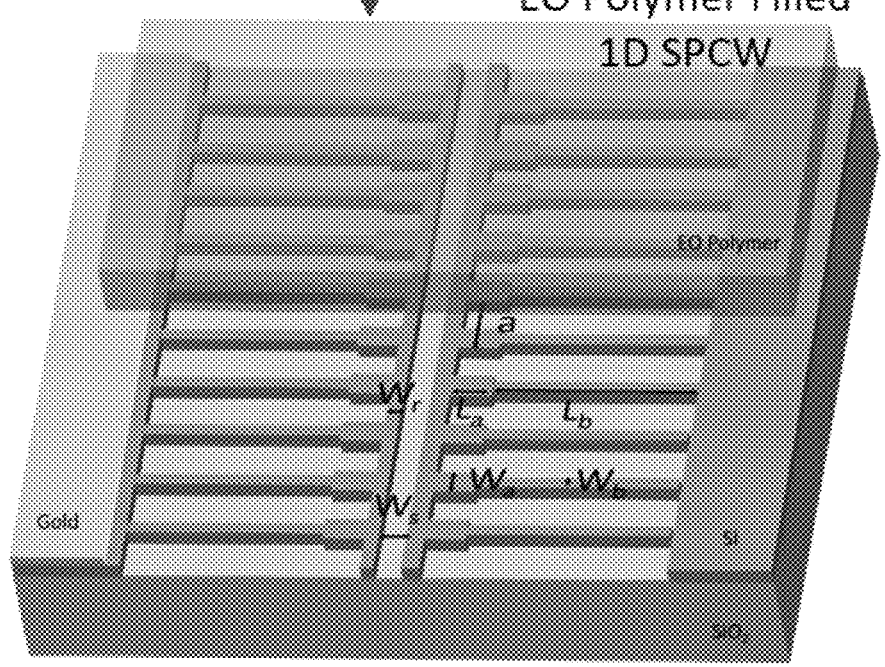

FIG. 13A shows the schematic of a disclosed sensor based on a bowtie antenna coupled MZI structure, in accordance with some embodiments. Light coupled from an inverse taper coupler is split into two arms: one EO polymer filled 1D slot photonic crystal waveguide (SPCW) and the other a strip waveguide with teeth. The phase is modulated within the 1D SPCW arm and subsequently causes the output optical intensity variation when the light of the two arms interfere. FIG. 13B is the isometric cut away schematic of the slow light enhanced EO polymer filled 1D SPCW, which comprises a slot and two sections of teeth connected to bulk silicon.

Figure 14A:
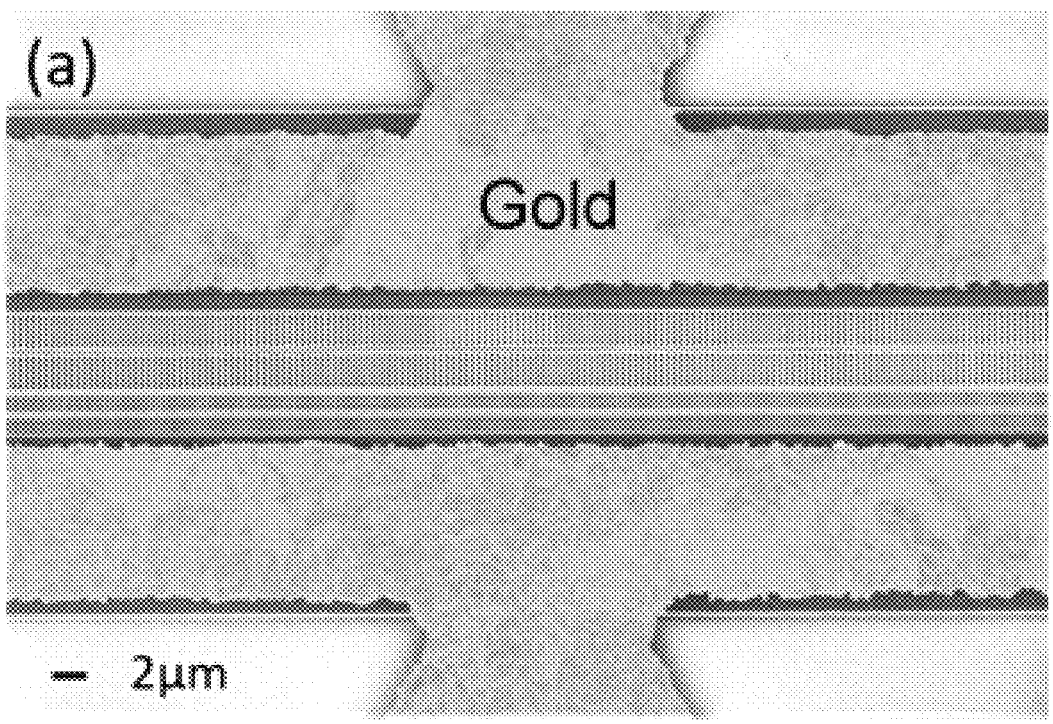
Figure 14B:
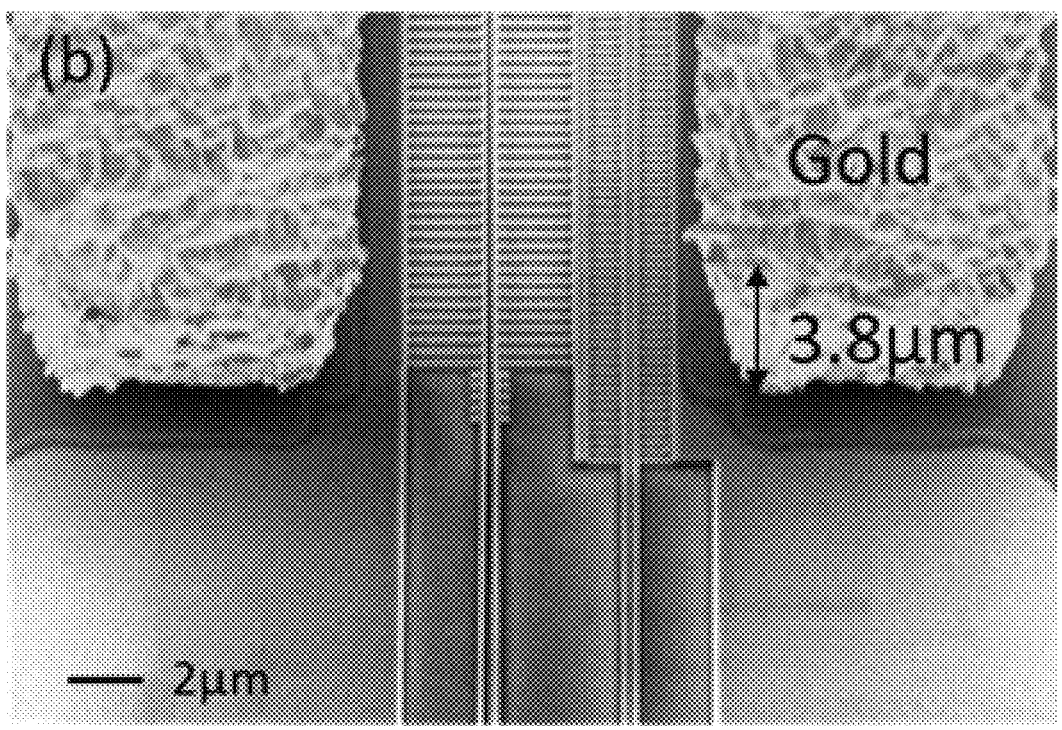
Figure 14C:
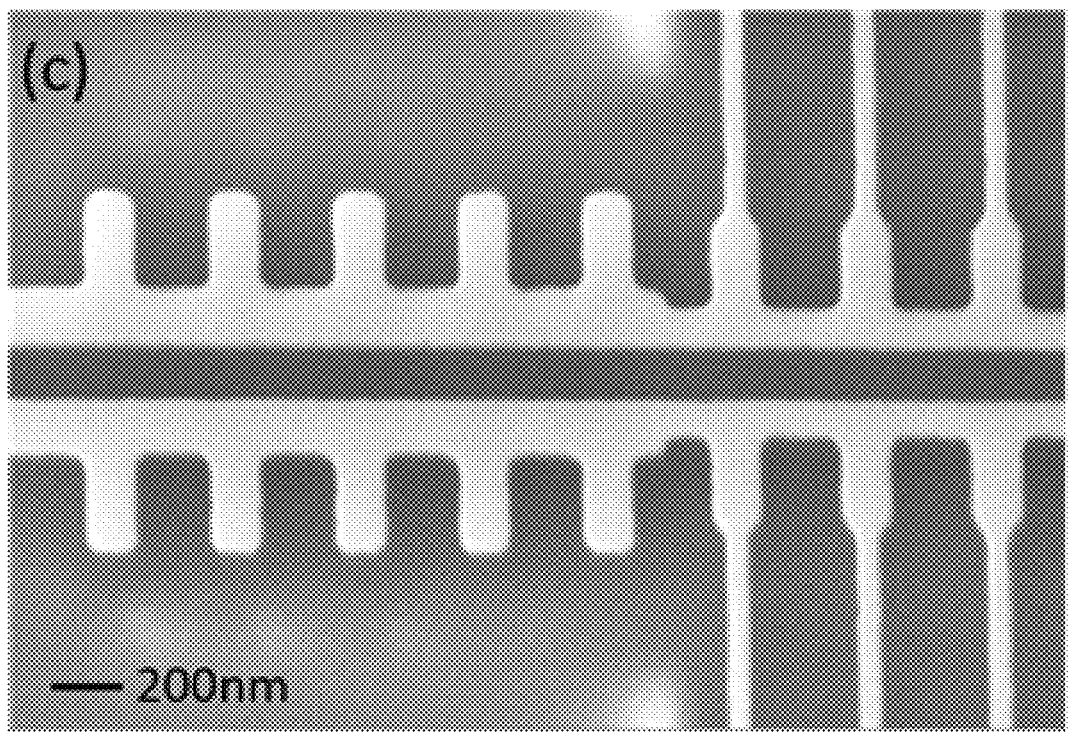
Figure 14D:
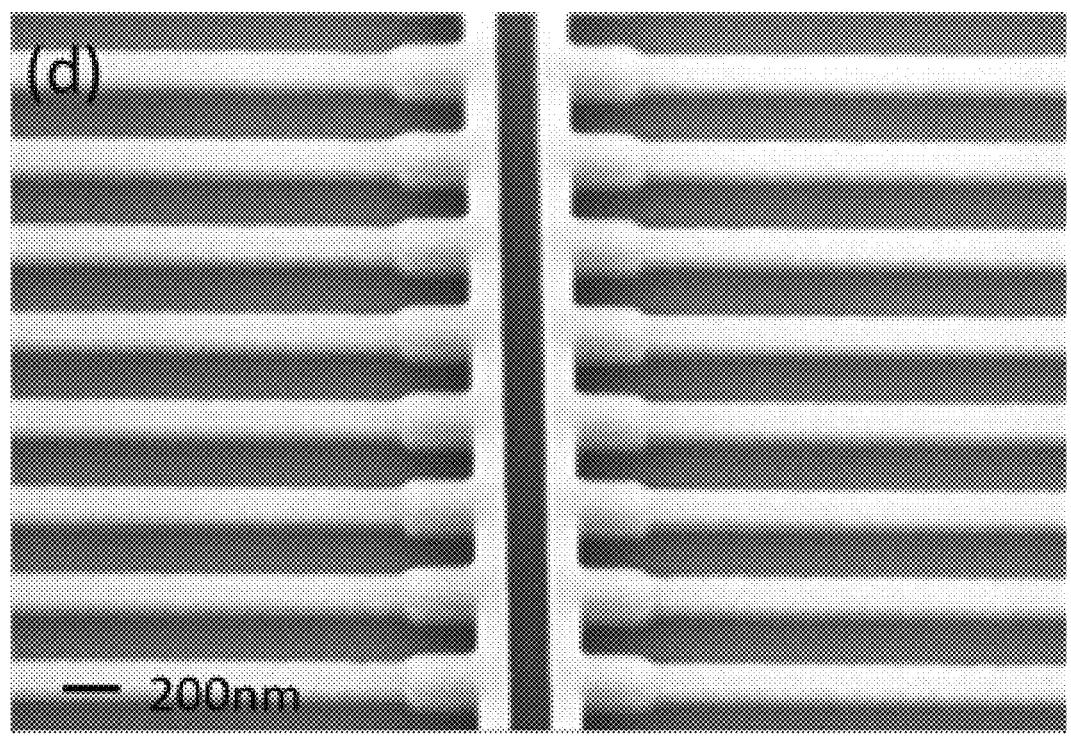

FIGS. 14A-14D are SEM images of a fabricated device, in accordance with some embodiments. FIG. 14A is a top view of the MZI structure with gold antenna. FIG. 14B is an isometric top view of the MZI with gold antenna. FIG. 14C is a top view of the 1D SPCW region with 5 sets of step taper. FIG. 14D is an isometric top view of the 1D SPCW.

Figure 15A:
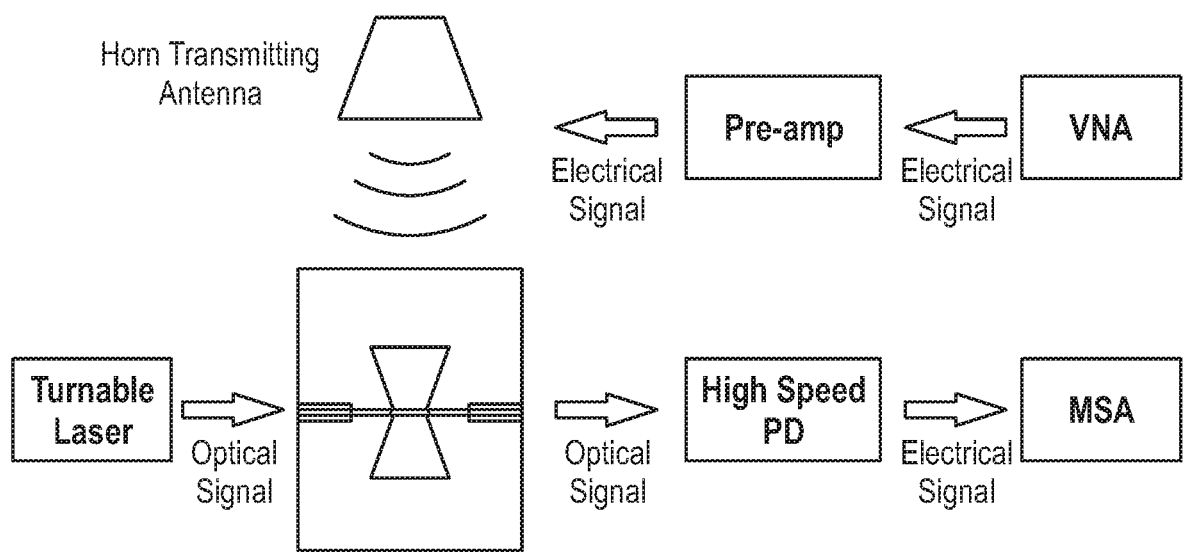
Figure 15B:
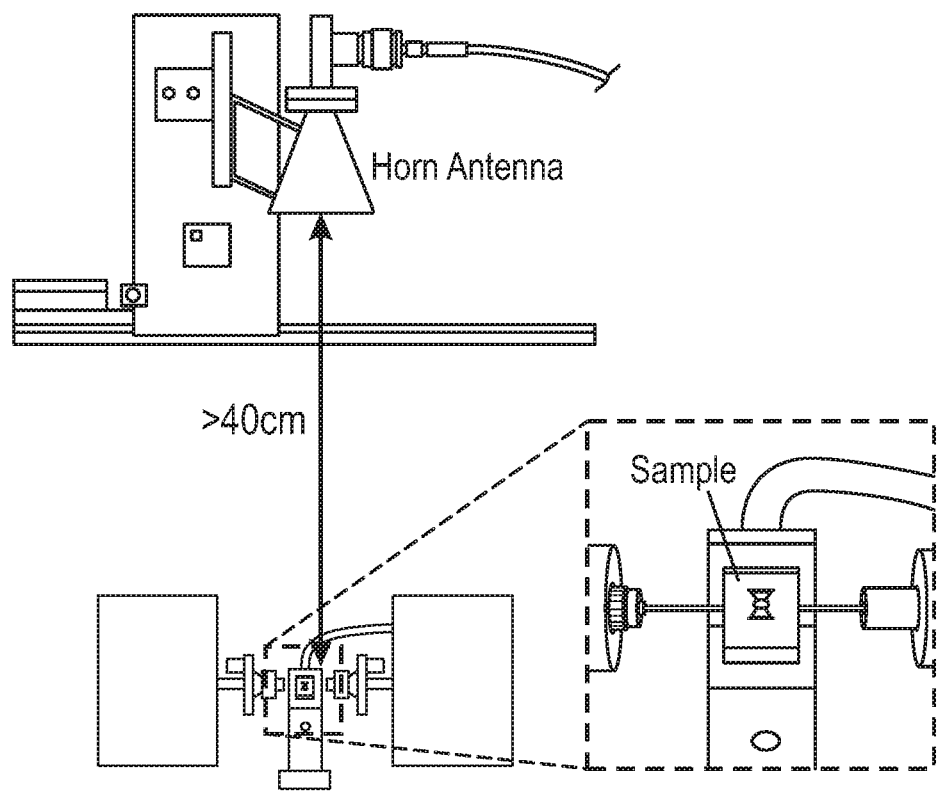
Figure 15C:
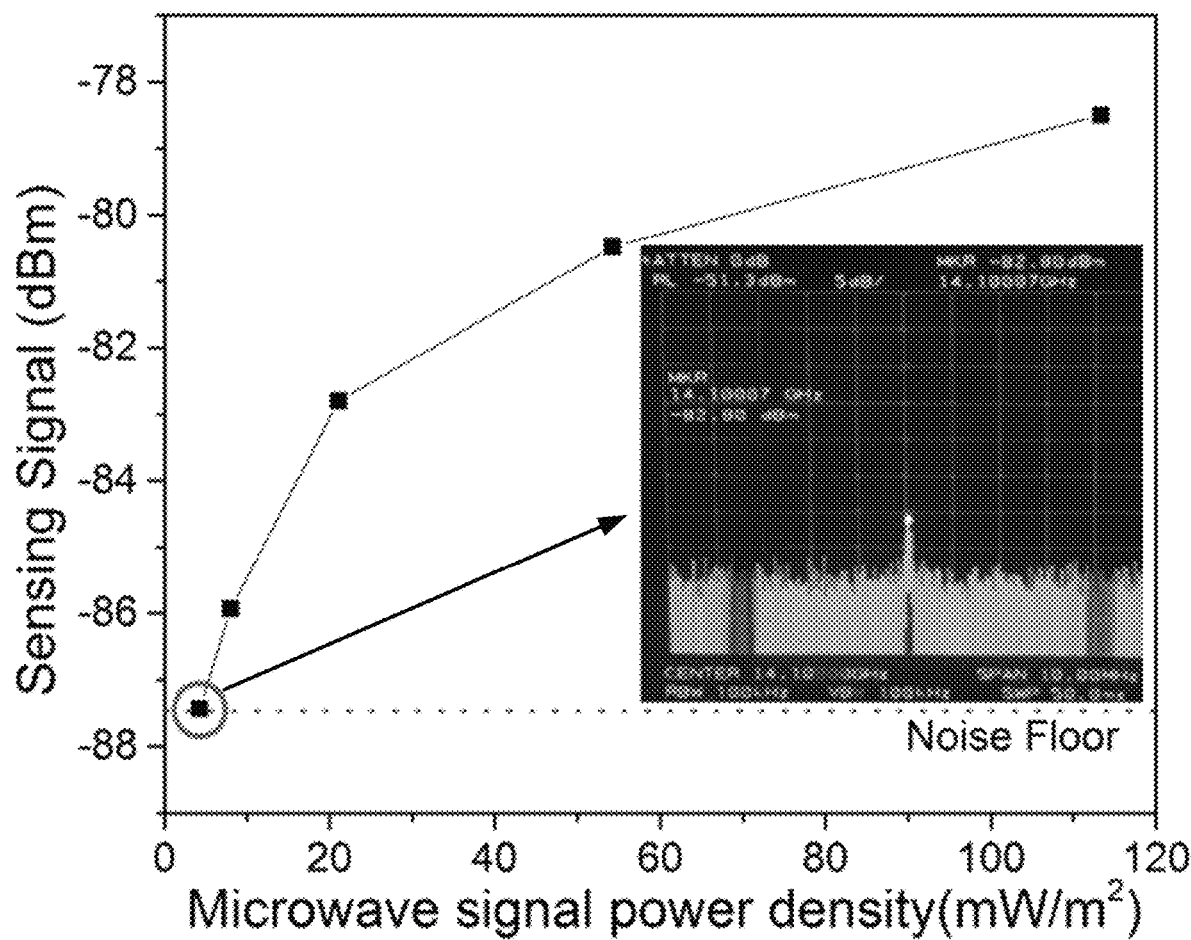

FIG. 15A is a schematic of an EM wave sensing testing setup showing the optical signal and electrical signal paths. FIG. 15B shows the horn antenna as a transmitting antenna at far field distance with respect to the device. The inset of FIG. 15B shows a zoomed in image of the device and two coupling lensed fibers. FIG. 15C is a graph showing the measured sensing signal reading from the MSA versus different microwave input signal powers.

V. DETAILED DESCRIPTION

Detailed Description of the Invention

Detailed descriptions of the preferred embodiments are provided herein. It is to be understood, however, that the present invention may be embodied in various forms. The specific details disclosed herein are not to be interpreted as limiting, but rather as a basis for the claims and as representative basis for teaching one skilled in the art to employ the present invention in virtually any appropriately detailed system, structure, or manner. In all the accompanying drawings, same numerals are used within each figure to represent the same or similar materials, and redundant descriptions are omitted.

The present disclosure teaches methods and apparatuses to enhance the photon-matter interaction of conventional slot waveguides. The principle behind these methods and apparatuses may be summarized as introducing perturbations or defects into conventional slot or strip waveguides to slow down or trap photons. The present disclosure demonstrates theoretically and experimentally that by modulating the rails of conventional strip waveguides, a group index over 25 may be achieved.

Figure 1B:
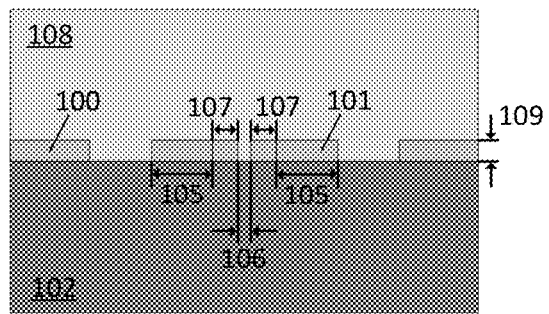
FIG. 1B and FIG. 1C are the cross-sections taken along the dashed lines AA-AA' and BB-BB' of FIG. 1A, respectively.
Figure 1C:
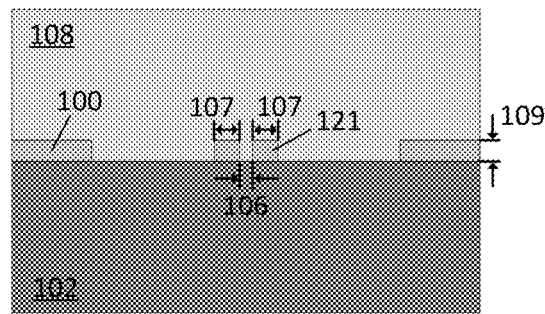

The fundamental principle of this invention is to generate structural disturbances along the mode propagation direction to slow down the propagation of photons and generate the so-called structural slow light. The disturbance may be created through a wide range of structures. As an example, the structure of a 1D PC slot waveguide is shown in FIG. 1A. FIG. 1A is a top view schematic drawing of the 1D slot photonic crystal waveguide surrounded by peripheral bulk silicon 100. FIG. 1B and FIG. 1C are the cross-sections taken along the dashed lines AA-AA' and BB-BB' of FIG. 1A, respectively. This embodiment is formed by a conventional slot waveguide with periodic rectangular teeth 101 on the outside edges of its substantially parallel rails 121. The structural parameters, including the period 103, width 104, and length 105 of the rectangular teeth 101, the width of the rail 107, the width of the slot 106, and the height 109 of the teeth 101 and rails 121 are chosen to support the propagation of the optical mode while achieving high group index (slow light) around the optical wavelength of interest. The selection of the material for the top cladding 108 and the bottom cladding 102 vary in different applications as long as at least one optical guided mode is supported by the waveguide structure. The top cladding may comprise a gas or liquid such as air and solvents. The shape of the teeth 101 is not limited to rectangles. In alternate embodiments, the shape of the teeth may be circular, triangular, elliptical, etc.

The position of the teeth is also not limited to the outer edges of the rails. In an alternate embodiment, the teeth may be placed along the inner edges or even on the rails, as shown in FIG. 2A and FIG. 3A, respectively. FIG. 2A is a top view schematic drawing of the 1D slot photonic crystal waveguide surrounded by peripheral bulk silicon 200.

Figure 2B:
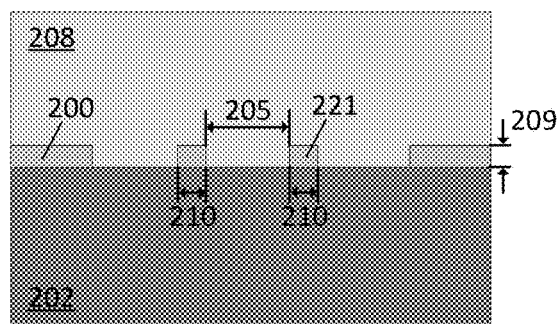
FIG. 2B and FIG. 2C are the cross-sections taken along the dashed lines CC-CC' and DD-DD' of FIG. 2A, respectively.
Figure 2C:
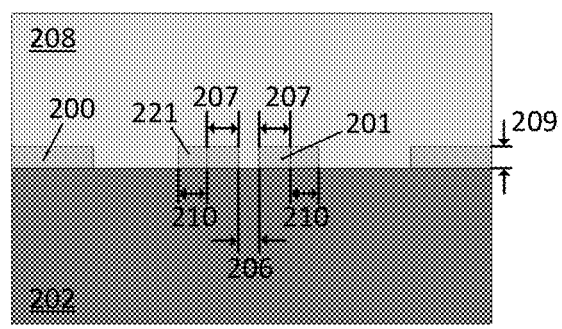

FIG. 2B and FIG. 2C are the cross-sections taken along the dashed lines CC-CC' and DD-DD' of FIG. 2A, respectively. Similarly to the waveguide structure of FIG. 1A, the structural parameters, including the period 203, width 204, and length 207 of the rectangular teeth 201, the width 210 of the rail 221, the width of the slot 206, the height 209 of the teeth 201 and rails 221, and the width 205 between the rails 221 are chosen to support the propagation of the optical mode while achieving high group index (slow light) around the optical wavelength of interest. The selection of the material for the top cladding 208 and the bottom cladding 202 vary in different applications as long as at least one optical guided mode is supported by the waveguide structure. The top cladding may comprise a gas or liquid such as air and solvents. The shape of the teeth 201 is not limited to rectangles. In alternate embodiments, the shape of the teeth may be circular, triangular, elliptical, etc.

Figure 3B:
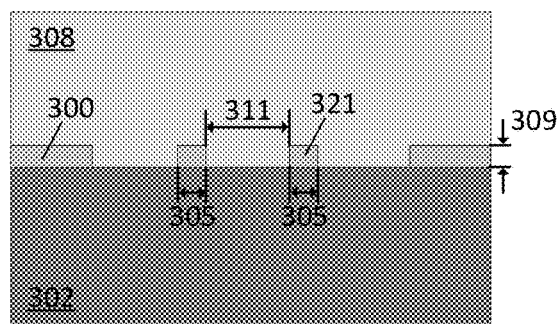
FIG. 3B and FIG. 3C are the cross-sections taken along the dashed lines EE-EE' and FF-FF' of FIG. 3A, respectively.
Figure 3C:
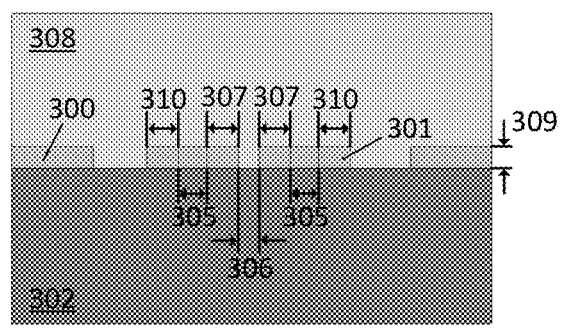

FIG. 3A is a top view schematic drawing of the 1D slot photonic crystal waveguide surrounded by peripheral bulk silicon 300. FIG. 3B and FIG. 3C are the cross-sections taken along the dashed lines EE-EE' and FF-FF' of FIG. 3A, respectively.

Similarly to the waveguide structure of FIG. 1A, the structural parameters, including the period 303, width 304, inside length 307, and outside length 310 of the rectangular teeth 301, the width 305 of the rail 321, the width of the slot 306, the height of 309 of the teeth 301 and rails 321, and the width 311 between the rails 321 are chosen to support the propagation of the optical mode while achieving high group index (slow light) around the optical wavelength of interest. The selection of the material for the top cladding 308 and the bottom cladding 302 vary in different applications as long as at least one optical guided mode is supported by the waveguide structure. The top cladding may comprise a gas or liquid such as air and solvents. The shape of the teeth 301 is not limited to rectangles. In alternate embodiments, the shape of the teeth may be circular, triangular, elliptical, etc.

The position of individual teeth may also be varied to generate special properties, such as low dispersion. FIG. 4A, FIG. 4B, and FIG. 4C illustrate the structural phase shifts 401, 402, and 403, respectively, applied to the periodic bars on one rail. FIG. 4D illustrates another embodiment in which the phase shift 404 is applied between the inner and outer bars.

FIGS. 5A, 5B, 5C, 5D, 5E, 5F, 5G, 5H and 5J show that a resonance cavity to trap photons may be created in the 1D slot photonic crystal waveguide by introducing defects into the periodic structure. The defects may be generated through tuning and varying the width, length, and/or period of one or more bars in the embodiments illustrated in FIG. 1A, FIG. 2A, and FIG. 3A. FIG. 5A, FIG. 5B, and FIG. 5C are schematic drawings of the 1D photonic crystal slot cavity surrounded by peripheral bulk silicon 100 generated by tuning the width 501, length 502, or period 504, respectively, of the bars of the waveguide illustrated in FIG. 1A. FIG. 5D, FIG. 5E, and FIG. 5F are schematic drawings of the 1D photonic crystal slot cavity surrounded by peripheral bulk silicon 200 generated by tuning the width 505, length 506, or period 507, respectively, of the bars of the waveguide illustrated in FIG. 2A. FIG. 5G, FIG. 5H, and FIG. 5J are schematic drawings of the 1D photonic crystal slot cavity surrounded by peripheral bulk silicon 300 generated by tuning the width 509, length 510, or period 512, respectively, of the bars of the waveguide illustrated in FIG. 3A. The length of a cavity can be controlled by the number of defects introduced into the 1D photonic crystal slot cavity.

Additional structures may be introduced to customize the 1D slot waveguide. FIG. 6A, FIG. 6B, FIG. 6C, and FIG. 6D show an embodiment with narrow connecting bars or teeth connecting the bars or teeth coupled to the rails to the peripheral bulk silicon region. The basic structure is a 1D slot photonic crystal waveguide, as shown in FIG. 1A. This embodiment is formed by a conventional slot waveguide with periodic rectangular teeth 601 on the outside edges of its rails 621. FIG. 6A is a top view schematic drawing of the 1D slot photonic crystal waveguide with the narrow bars or teeth 611 connecting the bars 601 to the peripheral silicon 600. FIG. 6B, FIG. 6C, and FIG. 6D are the cross-sections taken along the dashed lines GG-GG', HH-HH', and JJ-JJ' of FIG. 6A, respectively. The structural parameters, including the period 603, width 604, and length 605 of the rectangular teeth 601, the width 607 of the rail 621, the width of the slot 606, and the height 610 of the teeth 601, 611 and rails 621 are chosen to support the propagation of the optical mode while achieving high group index (slow light) around the optical wavelength of interest. The selection of the material for the top cladding 612 and the bottom cladding 602 vary in different applications as long as at least one optical guided mode is supported by the waveguide structure. Additional narrower connecting bars or teeth 611 are used to connect the structure, rails with coupled bars or teeth, to the adjacent bulk silicon region 600. The width 608 and length 609 of the connecting bars or teeth are optimized to avoid the disturbance to the mode in the original structure.

To interface the PC slot waveguide into current integrated photonics, which primarily rely on single mode strip waveguides, a taper converting the fundamental mode of the strip waveguide into the mode that can propagate in the proposed slow light slot structure is needed. One embodiment is comprised of two sections, one from strip to slot waveguide and the other from slot waveguide to slow light slot waveguide. The transition from strip mode into slot mode is realized through either an S or V shape mode converter. The transition from the fast to slow slot mode may be accomplished via an adiabatic or step taper. FIG. 7A is a top view schematic drawing of the 1D slot photonic crystal waveguide with step tapers on the two ends of a section of periodic waveguide with intermediate geometrical dimensions surrounded by peripheral bulk silicon 700. FIG. 7B, FIG. 7C, FIG. 7D, and FIG. 7E are the cross-sections taken along the dashed lines KK-KK', LL-LL', MM-MM', and NN-NN' of FIG. 7A, respectively. The structural parameters, including the period 703, width 704, and length 705 of the rectangular teeth 701, the width 707 of the rail 721, the width of the slot 706, and the height 709 of the teeth 701 and rails 721 of the section of periodic waveguide, are chosen to support the propagation of the optical mode while achieving high group index (slow light) around the optical wavelength of interest. The step taper, comprising a section of periodic waveguide with intermediate geometrical dimensions, including the period 711, width 712, and length 713 of the rectangular teeth 731 and the width 714 of the rail 741 of the section of periodic waveguide, is chosen to support the propagation of the optical mode. The selection of the material for the top cladding 708 and bottom cladding 702 vary in different applications as long as at least one optical guided mode is supported by the waveguide structure.

FIG. 8A shows an isometric cutaway schematic of a 1D slot photonic crystal waveguide formed from a conventional slot waveguide with periodic rectangular teeth on the outside of the rails of the slot waveguide. FIG. 8B is a top view schematic drawing of the 1D slot photonic crystal waveguide of FIG. 8A. FIG. 8C is the cross-section taken along the dashed line PP-PP' of FIG. 8B. The structural parameters of the 1D PC slot are chosen to support single mode propagation while achieving high group index (slow light) around the optical wavelength of 1550 nm. The period P of the rectangular teeth is 415 nm. The width a and length b of the teeth are 124.5 nm (0.3P) and 300 nm, respectively. The slot has a width $S_w$ of 150 nm and a rail width $R_w$ of 100 nm. The 1D PC slot waveguide sits on top of a silicon dioxide $SiO_2$ layer and is covered with EO polymer (SEO 125

Soluxra, LLC., n=1.63). FIG. 9A shows the simulated photonic band diagram of the quasi-transverse-electric (TE) modes of the 1D PC slot waveguide using the 3D plane wave expansion method. The nearly flat region of the lowest band is chosen as the operating range. It supports the propagation mode in the PC slot waveguide and has a high group index ($n_g>40$) close to the band edge (as shown in the inset of FIG. 9A). The electric field intensity distribution of the mode at the band edge is shown in FIG. 9B, FIG. 9C, and FIG. 9D. FIG. 9B is the mode profile of the modes on the fundamental band. FIG. 9C and FIG. 9D are the mode profiles of a horizontal cut plane and a vertical cross-section, respectively, of FIG. 9B. Optical power is strongly confined in the slot and the ratio of the optical power in the EO polymer region is calculated to be $\sigma=0.35$.

The 1D PC slot waveguide is accessed through conventional slot waveguides. To compensate for mode mismatch and to improve coupling efficiency at the interface of the conventional slot waveguide and the 1D PC slot waveguide, a coupler is utilized. FIG. 10 shows a representative modulator structure, in accordance with some embodiments. One arm of the modulator is loaded with the slow light waveguide. SEM pictures of the device are shown by the insets. Instead of using an adiabatically tapered long coupler, a very short intermediate low-group-index coupler (step taper) is used. The optimized step taper consists of 5 periods of PC slot waveguide with shorter teeth ($b_T$=200 nm) and slightly larger period ($P_T$=425 nm). The width of the teeth remains unchanged ($a_T$=0.3$P_T$, 127.5 nm). The parameters of the step taper (period $P_T$, tooth length $b_T$ and width $a_T$, number of periods N) were optimized by transmission spectrum simulation using a 3D finite difference time domain (FDTD) method. Parts of the optimization process are illustrated in FIG. 11A, FIG. 11B, FIG. 11C, and FIG. 11D. In FIG. 11A, $a_T$, $b_T$, and N are fixed while $P_T$ is scanned from 420 nm to 430 nm. Similarly, in FIG. 11B and FIG. 11C, N and $b_T$ are scanned individually, respectively. In this way, the optimized parameters for the step taper are determined. FIG. 11D compares the simulated transmission before and after implementing the optimized step taper. It can be seen from FIG. 11D that the large fluctuations resulting from the group index mismatch have been significantly reduced by the short step taper (total length~2 µm) and the additional loss caused by the taper is negligible. Finally, the conventional slot waveguide is connected to a strip waveguide through an s-shape strip-to-slot mode converter. FIG. 11E shows the measured transmission spectrum of a 200 Lm long 1D PC slot waveguide filled with EO polymer. A clear band edge may be observed near 1550 nm.

To characterize the 1D PC slot waveguide as a phase shifter for modulators, an MZI structure was designed with one arm loaded with a 200 µm long 1D PC slot waveguide, as illustrated in FIG. 10. The proposed 1D PC slot waveguide, along with all connecting strip waveguides, 1×2 multi-mode interferometer (MMI), and subwavelength grating couplers, were patterned by e-beam lithography on a silicon-on-insulator (SOI) chip with 250 nm thick top silicon layer. The pattern was then transferred onto the silicon layer through a single reactive ion etching (RIE) step. Gold electrodes were formed by a photolithography, e-beam evaporation, and lift-off process. The gap size between the two electrodes is 4 µm. The insets of FIG. 10 show the scanning electron microscope (SEM) images of a fabricated silicon 1D PC slot waveguide and step taper, strip-to-slot mode converter, grating coupler, and also the microscopic image of the MMI up to the above steps. Finally, the EO polymer was coated on the PC slot waveguide and cured overnight under vacuum at 80° C. This ensures that the polymer infiltrates the PC slot structures thoroughly. Before the modulation measurement, the EO polymer goes through a poling process at its glass transition temperature of 150° C. with an external electric field of 100 V/µm applied through the gold electrodes. The poling process aligns the chromophores in the same direction in the host polymer and activates its EO effect.

Transmission spectra of a fabricated device were obtained from a testing platform using a broadband amplified spontaneous emission (ASE) source (1510 nm-1630 nm) and an optical spectrum analyzer. Light from the ASE source was guided through a polarizer to subwavelength grating couplers to excite the fundamental quasi-TE mode of the on-chip strip waveguides. Transmission spectrum of the unbalanced MZI without applying any voltage on the electrodes was first measured and is shown in FIG. 12A. The oscillations in the spectra are due to the group velocity difference between the two arms of the MZI. The oscillation period decreases rapidly at the band edge of the 1D PC slot waveguide, approximately 1567 nm. The group index therefore can be estimated from the oscillation patterns using the equation:

$$n_g^{pcw}(\lambda) = n_g^{ref}(\lambda) + \frac{\lambda_{min}\lambda_{max}}{2L(\lambda_{min} - \lambda_{max})}$$

where $n_g^{pcw}$ is the group index of the 1D PC slot waveguide, $n_g^{ref}$ is the group index of the reference strip waveguide ($n_g^{ref}$=4.2), $\lambda_{min}$ and $\lambda_{max}$ are the wavelengths at an adjacent valley and peak of the oscillations, and L=200 Lm is the length of the phase shifter. The estimated group indices are drawn on the same graph of FIG. 12A. A group index of nearly 25 is observed and the total loss of the MZI structure is ~10 dB, which includes the propagation loss of the 200 µm 1D PC slot waveguide as well as the coupling losses on the step taper, mode converter, and MMI. The propagation loss in the 1D PC slot is estimated at about 15 dB/mm. This loss is higher than conventional slot waveguide filled with EO polymer (4 dB/mm) but is significantly smaller than the 2D PC slot waveguide under similar fabrication conditions. The much simpler structure of 1D periodic teeth along the slot waveguide reduces the scattering loss, which is a major source of loss in real devices, and makes the device more robust to fabrication imperfections.

To characterize the device performance, an electric field was applied on the phase shifter through the electrodes. FIG. 12B shows the transmission spectra under different electric fields generated by DC voltage. The spectra show red shifts with increasing electric field from 0 to 10 V/Lm. The phase shift induced by the applied electric field can be estimated from the equation $\Delta\varphi=2\pi\lambda$/FSR, where FSR is the free spectral range of the oscillations in the MZI spectrum. The half-wave voltage, which is the applied voltage when $\Delta\varphi=\pi$, is estimated according to the relationship between applied voltage and wavelength shift obtained from the spectra. Based on these equations, EO modulation efficiency ($V_\pi L$) of 0.91 V·cm is calculated near the wavelength of 1562 nm. The effective EO coefficient of the EO polymer, $r_{33eff}$, can then be estimated by:

$$r_{33eff} = \frac{\lambda W}{n^3 V_\pi \sigma L}$$

where n=1.63 is the refractive index of the EO polymer, σ is the ratio of optical mode power in the EO polymer, and W is the gap size between the electrodes. The estimated $r_{33eff}$ near 1562 nm is 490 pm/V. This high $r_{33}$ value is a result of the enhancement effect of slow group velocity of the waveguide mode. FIG. 12C shows the group index and effective EO coefficient as a function of wavelength in the same diagram. The increasing $r_{33eff}$ with increasing group index confirms that the effective EO coefficients and thus modulation efficiencies are enhanced by the slow light effect in our proposed PC slot waveguide.

A figure-of-merit $f=\sigma \cdot n_g \cdot L_{3dB}$, where σ is the ratio of optical mode in the EO polymer region, $n_g$ is the group index in the waveguide, and $L_{3dB}$ is the length of phase shifter in millimeters with 3 dB propagation loss may be defined for the phase shifter design. This figure-of-merit reflects a phase shifter's ability to efficiently confine and modulate the propagation mode in the waveguide. The figure-of-merit of an embodiment of the disclosed 1D PC slot structure is f=0.35×20×0.2~1.4 considering the 15 dB/mm propagation loss. The figure-of-merit for a conventional slot waveguide based EO modulators is f~0.4×2×0.75~0.6 considering a typical propagation loss of 4 dB/mm when filled with EO polymer. In a 2D PC slot waveguide, a and $n_g$ are similar to the disclosed 1D PC waveguide, but the $L_{3dB}$ is smaller due to the larger scattering loss from the 2D PC structure. Thus, in the 1D PC slot waveguide, the slow light effect provides more benefits than the extra propagation loss it induces, while the overlap factor is as high as that in conventional slot waveguides resulting in improved efficiency in EO modulators versus those based on conventional slot waveguides or 2D PC slot waveguides.

The measurement results of FIG. 12A, FIG. 12B, and FIG. 12C demonstrate the slow light enhancement in the disclosed structure, however it is not optimized for high efficiency operation. To further reduce the half-wave voltage, it is feasible to use a strip-loaded structure or to add narrow contacting arms to the PC teeth to connect the bulk silicon under the electrodes. Considering high speed operation, the silicon slabs between the electrodes and the slot filled with EO polymer is similar to an RC circuit, where the 3 dB frequency bandwidth may be estimated by ½πRC. Through finite element simulation, the 3-dB bandwidth of the disclosed structure may achieve 61 GHz. To make the most out of the ultra-fast response time of the EO polymer material, the silicon slab may be properly doped to further reduce the equivalent resistance and improve the bandwidth. With these additional considerations, the silicon-organic hybrid modulator is capable of high speed operation of tens of GHz or even higher.

The disclosed waveguide structure may also be used as a sensing component to detect the refractive index disturbance within the reach of the optical mode. Together with other functional materials and enhancement mechanisms, the performance of the sensor may be further improved. These materials include but are not limited to second-order nonlinear optical materials, third-order nonlinear optical materials, polymers, bio-materials, etc. For all-optical switches, top cladding materials with large third-order nonlinearity and small third-order absorption are applied through spin-casting, deposition, or transferring. These materials include but are not limited to 2D materials (graphene, graphene oxide, etc.), polymer (DDMBT, etc.), and semiconductor materials (silicon nitride, etc.). For instance, the waveguide may be used in conjunction with EO polymer and antennas to form ultrasensitive EM wave sensors. Such a sensor features a set of bowtie antenna and an MZI structure with one arm of slow-light enhanced EO polymer infiltrated 1D SPCW and the other arm of silicon strip waveguide with teeth of subwavelength pitch, as shown in the detailed view of the 1D SPCW structure of FIG. 13A and FIG. 13B. The device region is doped with two-step ion implantation. The doping profile is tailored so that the resistance at the implanted region is greatly reduced and the signal voltage drop is mostly across the slot while the absorption loss is still low. The bowtie antenna is designed to harvest and concentrate the electrical field of the EM wave and apply it onto the slow light enhanced EO polymer filled SPCW to modulate the phase of the guided optical wave. Inverse taper couplers with polymer overlay are incorporated to efficiently couple light in and out of the sensor. The gold bowtie antenna with a pair of extension bars attached to the bowtie vertices are designed to make full use of the entire length of EO interaction range. This antenna provides uniform electrical field enhancement in the feed gap along the extension bar direction and therefore is suitable for integrating the MZI structure in the gap. To assure the majority of the enhanced high speed electrical field falls across the EO polymer infiltrated slot, a two-step ion implantation may be adopted to reduce the RC time delay induced by the bulk silicon and silicon teeth.

The fabrication of the sensor disclosed in FIG. 13A and FIG. 13B starts with an SOI wafer with a 220 nm device layer and a 3 μm-thick buried oxide layer implanted with phosphorus of 1e17 $cm^{-3}$. Cross-shaped platinum alignment marks are patterned for e-beam lithography alignment. The sample is then implanted on designed opening regions with phosphorus to 1e20 $cm^{-3}$ and rapid thermal annealed at 1000° C. for 10 seconds. Next, the MZI structure, Y-junction splitter & combiner, and silicon taper for inverse taper couplers are patterned using a Jeol 6000 FSE e-beam lithography system and etched by reactive ion etching (RIE). The silicon device layer in the antenna region is then etched away through photolithography and RIE so that the antenna can sit on the buried oxide layer to reduce the EM wave reflection. The 3.8 μm antenna is electroplated using a 5 nm/100 nm chromium/gold seed layer with the MZI structure region protected to avoid the contamination in the slot and teeth region. After the seed layer is removed with gold and chromium etchant, the SU-8 inverse taper overlay layer is patterned. Finally, EO polymer is formulated, coated, and cured at 80° C. in a vacuum oven for overnight. Scanning electron microscope (SEM) images of the sensor are shown in FIG. 14A, FIG. 14B, FIG. 14C, and FIG. 14D, which show good fabrication accuracy and fine alignment between each of the fabrication steps. The EO polymer is poled to align the chromophores and initiate the EO effect before waveguide cleaving and subsequent testing. The poling process is conducted at the EO polymer glass transition temperature of 150° C., with an external electric field of 120 V/μm. The sensor is then cleaved at the inverse taper coupler region for light coupling.

An EM wave sensing experiment is conducted using the setup illustrated in FIG. 15A and FIG. 15B. An HP-8510C vector network analyzer (VNA) is used as a microwave source. The microwave signal is amplified and then fed into a standard gain horn antenna covering 8.2 GHz-12.4 GHz. The horn antenna emits a wireless microwave signal at normal incidence with respect to the surface of the sensor. The distance of the horn antenna and the device is greater than 40 cm to ensure the far field radiation distance calculated by $2D^2/\lambda$, where D is the dimension of the horn antenna and λ is the wavelength of the microwave signal. A polarized tunable laser source is fed into the device using the same setup as the passive optical spectrum testing. The output light of the device is connected to a New Focus 1014 high speed photo diode (PD) and then connected to an HP 8563E microwave spectrum analyzer (MSA) to analyze the signal. FIG. 15C is a graph showing the measured sensing signal reading from the MSA versus different microwave input signal powers. As shown in the inset oscilloscope trace of FIG. 15C, when a 6.7 dBm 14.1 GHz signal is input into the antenna, the MSA reads −82.8 dBm, which indicates the optical signal is successfully modulated at the same frequency.

The frequency range of a standard gain horn antenna covers only 8.2 to 12.4 GHz as specified. In order to test the frequency response of the sensor around 14.1 GHz, a normalized factor is considered to exclude the frequency response caused by the antenna and to obtain the real response of the sensor. The frequency response of the sensor is tested from 11 GHz to 14.5 GHz with 0.5 GHz steps and with normalized factors (NF) at this frequency range derived from the equation:

$$NF = \frac{P}{P_{max}} = (1 - |\Gamma|^2) \times G,$$

where the NF is the power at the interested frequency divided by the power maxima within the frequency range. $\Gamma$ is the reflection coefficient, and G is the antenna gain. The $\Gamma$ values are obtained using measured S11 values with cable and antenna. G is simulated antenna gain in the normal incident direction. In order to determine the limit of detection of the EM wave sensor in terms of electromagnetic wave power density, the relationship between the power density at certain distances away from the horn antenna and the input microwave power into horn antenna may first be derived:

$$S = \frac{G \times P}{4\pi R^2},$$

where S is the averaged power density (Poynting vector) in the unit of mW/m$^2$, G=10 dB is the horn antenna gain with NF at the nominal direction, P is the microwave power input into the horn antenna, and R=42 cm is the distance between the horn antenna and the sample. The limit of detection of the sensor may be measured by decreasing the input microwave power into the horn antenna so that the MSA reading reaches the noise floor. FIG. 15C shows a plot of the sensing signal from the reading of MSA versus the input microwave power into the horn antenna. When the input microwave power decreases to 4.31 mW/m$^2$, the MSA reading is −87.43 dBm, which is less than 1 dB higher than the noise floor. Therefore, the limit of detection of the device at 14.1 GHz is 4.31 mW/m$^2$, which corresponds to the minimum detectable electric field of 1.28 V/m using the equation:

$$|E| = \sqrt{\frac{2S}{\varepsilon_0 \varepsilon_r c}},$$

where $\varepsilon_0$ is the vacuum dielectric constant, $\varepsilon_r$ is the dielectric constant of the air, c is the speed of light, and S is the averaged power density from the horn antenna. The disclosed and tested sensor structure takes advantage of the low loss and strong slow light effect of the 1D SPCW, high electric field enhancement of the bowtie antenna, and large EO coefficient of the EO polymer, which enables the detection of an EM wave with electric field intensity of 1.28 V/m. The device is only 4.6 mm×4.8 mm in size and has an active region of 300 µm offering a compact solution for a vast range of EM wave applications.

In addition to the sensors that detect the change of effective index, which can be caused by the variation of the refractive of the cladding or the waveguide itself, the sensors may also be exploited in spectroscopy, in which the photon-matter interaction is of essential importance to the performance of the sensors. These spectroscopies include but are not limited to absorption spectroscopy, Raman spectroscopy, etc.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions and improvements fall within the scope of the invention as detailed within the following claims.

The invention claimed is:

1. An apparatus for communication or sensing comprising:
  a substrate;
  a bottom cladding disposed on the substrate;
  a device layer disposed on the bottom cladding, wherein the device layer comprises:
    two substantially parallel rails extending from an input side to an output side of the device layer and configured to form a slot between the two substantially parallel rails, wherein each of the two substantially parallel rails comprises an inner edge adjacent to the slot and an outer edge opposite the slot; and
    one or more teeth coupled to each of the two substantially parallel rails; and
  a top cladding disposed onto the device layer and bottom cladding;

wherein the bottom cladding, the device layer, and the top cladding are configured to support at least one optical guided mode.

2. The apparatus of claim 1, further comprising an input taper coupled to the input side of the device layer and an output taper coupled to the output side of the device layer.

3. The apparatus of claim 2, further comprising an input inverse taper coupler coupled to the input taper opposite the device layer and an output inverse taper coupler coupled to the output taper opposite the device layer.

4. The apparatus of claim 1, wherein the device layer comprises silicon.

5. The apparatus of claim 1, wherein the top cladding comprises a second-order nonlinear material or a third-order nonlinear material.

6. The apparatus of claim 1, wherein the top cladding comprises a gas or liquid.

7. The apparatus of claim 1, wherein the one or more teeth are coupled to the inner edge of each of the two substantially parallel rails.

8. The apparatus of claim 1, wherein the one or more teeth are coupled to the outer edge of each of the two substantially parallel rails.

9. The apparatus of claim 1, wherein the one or more teeth are coupled to the inner edge and outer edge of each of the two substantially parallel rails.

10. The apparatus of claim 1, further comprising a bulk device layer region.

11. The apparatus of claim 10, further comprising one or more connecting bars coupled to the one or more teeth and the bulk device layer.

12. The apparatus of claim 1, wherein the one or more teeth coupled to each of the two substantially parallel rails are coupled with a periodic interval from the input side to the output side.

13. The apparatus of claim 1, wherein the one or more teeth coupled to each of the two substantially parallel rails are coupled with a phase shifted periodic interval from the input side to the output side.

14. The apparatus of claim 1, wherein the one or more teeth coupled to each of the two substantially parallel rails are randomly coupled from the input side to the output side.

15. The apparatus of claim 1, wherein the one or more teeth coupled to each of the two substantially parallel rails comprises a rectangular shape, a circular shape, a triangular shape, and/or an elliptical shape.

16. The apparatus of claim 1, wherein the one or more teeth coupled to each of the two substantially parallel rails are configured to create a resonance cavity by varying the width, the length, and/or the period of the one or more teeth.

17. The apparatus of claim 1, further comprising a bowtie antenna configured to concentrate an electrical field of an electromagnetic wave onto the device layer from the input side to the output side of the device layer.

* * * * *